US007349361B1

(12) United States Patent
Allaway et al.

(10) Patent No.: US 7,349,361 B1
(45) Date of Patent: *Mar. 25, 2008

(54) MOBILE TELEPHONY

(75) Inventors: Andrew Wayne Allaway, Cowley (GB); Martin Philip Usher, Ruislip (GB)

(73) Assignee: Stratos Global, Limited (GB)

( * ) Notice: Subject to any disclaimer, the term of this patent is extended or adjusted under 35 U.S.C. 154(b) by 1216 days.

This patent is subject to a terminal disclaimer.

(21) Appl. No.: 10/129,148

(22) PCT Filed: Aug. 10, 2000

(86) PCT No.: PCT/GB00/03091

§ 371 (c)(1),
(2), (4) Date: Oct. 21, 2002

(87) PCT Pub. No.: WO01/41317

PCT Pub. Date: Jun. 7, 2001

(30) Foreign Application Priority Data

Nov. 3, 1999 (EP) .................................. 99308728
Nov. 3, 1999 (GB) .................................. 99260853
Apr. 14, 2000 (GB) .................................. 00093591

(51) Int. Cl.
*H04B 7/185* (2006.01)

(52) U.S. Cl. ...................... 370/316; 370/352; 455/427

(58) Field of Classification Search ...................... None
See application file for complete search history.

(56) References Cited

U.S. PATENT DOCUMENTS 4,774,514 A    9/1988    Hildebrandt et al.
(Continued)

FOREIGN PATENT DOCUMENTS

EP          0 838 909        4/1998

(Continued)

OTHER PUBLICATIONS

Suzuki et al., "Call Routing and Data Model for Inter-Network Roaming in PCS", IEICE Trans. Commun., vol. E79 B. No. 9, Sep. 1996, pp. 1371-1379.

(Continued)

*Primary Examiner*—Phirin Sam
(74) *Attorney, Agent, or Firm*—Steptoe & Johnson

(57) ABSTRACT

An interface (52) is provided between a satellite telephone system (4) and a cellular telephone system (5) for allowing calls to a user's cellular telephone to be diverted to a satellite telephone handset (25) when the user is unable to use his cellular telephone, for example when on board an aircraft (2) fitted with a satellite telephone system (20). The user inserts a card (which may be the SIM of his mobile phone, or a card compatible with existing satellite telephone equipment) into a suitable reader in the satellite telephone (20), which causes the satellite ground station's card verification system (42) to connect to a host cellular network (50). The host cellular network has an interface unit (52) which emulates the operation of a normal base station, so that the host cellular system (50) acts as if the mobile user's terminal is roaming on the host network, but is currently "busy". The interface (52) also resets the user's existing call diversion instructions so that when the host cellular system (5) receives a busy tone from the base station emulator (52), it routes calls to the directory number of the terminal (20). Data messages originally formatted for transmission over the cellular telecommunications network for generation of a display on a display unit of a cellular telephone, can instead be transmitted over the satellite network for display on the information and entertainment system of the aircraft by replacing the address information in the original data message by address information appropriate to the selected display unit to generate an amended data message. A new data message is created, addressed to the server of the information display system and having the amended data message as payload. The onboard server has means for converting the amended data message into control instructions suitable to display the information content of the data message on the information display unit identified in the amended data message.

27 Claims, 14 Drawing Sheets

U.S. PATENT DOCUMENTS

| | | | |
|---|---|---|---|
| 5,438,610 A | 8/1995 | Bhagat et al. | |
| 5,490,284 A | 2/1996 | Itoh et al. | |
| 5,519,761 A | 5/1996 | Gilhousen | |
| 5,577,264 A | 11/1996 | Tuohino | |
| 5,842,132 A | 11/1998 | Fukutomi | |
| 5,887,258 A | 3/1999 | Lemozit et al. | |
| 5,918,175 A * | 6/1999 | Tayloe et al. | 455/427 |
| 5,950,129 A | 9/1999 | Schmid et al. | |
| 5,963,877 A | 10/1999 | Kobayashi | |
| 6,002,944 A | 12/1999 | Beyda | |
| 6,052,364 A * | 4/2000 | Chalmers et al. | 370/312 |
| 6,269,243 B1 | 7/2001 | Corbefin et al. | |
| 6,529,706 B1 * | 3/2003 | Mitchell | 455/12.1 |
| 6,760,778 B1 * | 7/2004 | Nelson et al. | 709/246 |
| 6,980,546 B2 * | 12/2005 | Purpura et al. | 370/352 |

FOREIGN PATENT DOCUMENTS

| | | |
|---|---|---|
| EP | 0 862 283 | 9/1998 |
| EP | 0 915 577 | 5/1999 |
| EP | 0 920 147 | 6/1999 |
| EP | 0 923 257 | 6/1999 |
| EP | 0 932 266 | 7/1999 |
| EP | 0 936 829 | 8/1999 |
| FR | 2773931 | 7/1999 |
| GB | 2169175 | 7/1986 |
| GB | 2282299 | 3/1995 |
| GB | 2310973 | 9/1997 |
| GB | 2320992 | 7/1998 |
| GB | 2324395 | 10/1998 |
| WO | WO 94/28684 | 12/1994 |
| WO | WO 97/36442 | 10/1997 |
| WO | WO 97/37500 | 10/1997 |
| WO | WO 98/21838 | 5/1998 |
| WO | WO 98/26521 | 6/1998 |
| WO | WO 99/12227 | 3/1999 |
| WO | WO 99/62274 | 12/1999 |
| WO | WO 01/15337 | 3/2001 |

OTHER PUBLICATIONS

Uchiyama et al., "Network Functions and Signaling for Personal Roaming between Digital Cellular Standards", IEEE International Conference on Universal Personal Communications, New York, IEEE, vol. CONF. 4, Nov. 1995, pp. 447-451.

Nodera et al., "Interworking between GSM and PDC through IC Cards", Proceedings of the Conference on Communications (ICC), New York, IEEE, Jun. 1995, pp. 761-765.

GSM World Press Release, "GSM Association Agreement with SkyPhone to Use *TAP* for Billing makes Calling from Aircraft Simple", http://www.gsm.org/news/press_releases_04.html, Aug. 1999.

Fernandez et al., "Le TFTS Alcatel 9810: un systemme europeen de communications air-sol", Commutation et Transmission, vol. 13, No. 4, Sotelec, Paris, France, 1991, pp. 5-16.

BTtoday NEWSDESK website, "Lift off for BT in-flight GSM service", http://today.intra.bt.com/art6594.html, Jul. 2000.

Beresford, "Office in the sky is now ready for take off", BT today, Jan. 2000, p. 4.

International Search Report for PCT/IB01/00830.
International Search Report for PCT/GB00/03074.
International Search Report for PCT/GB00/03087.
International Search Report for PCT/IB01/00811.
International Search Report for PCT/GB00/03088.
International Search Report for PCT/IB01/00802.

* cited by examiner

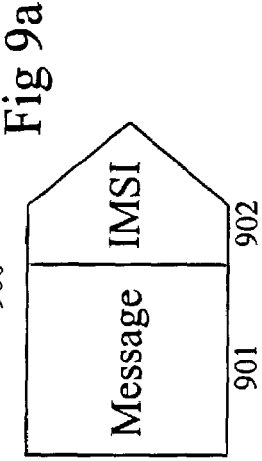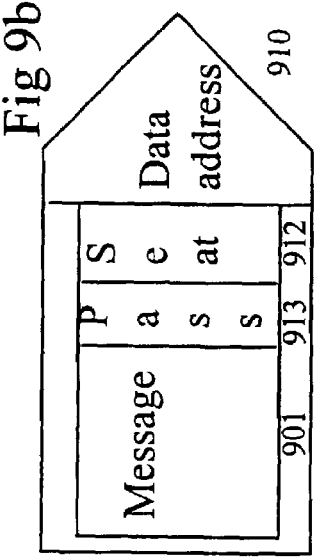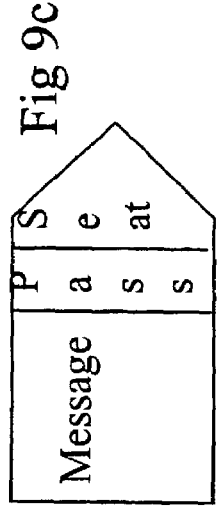
Figure 9
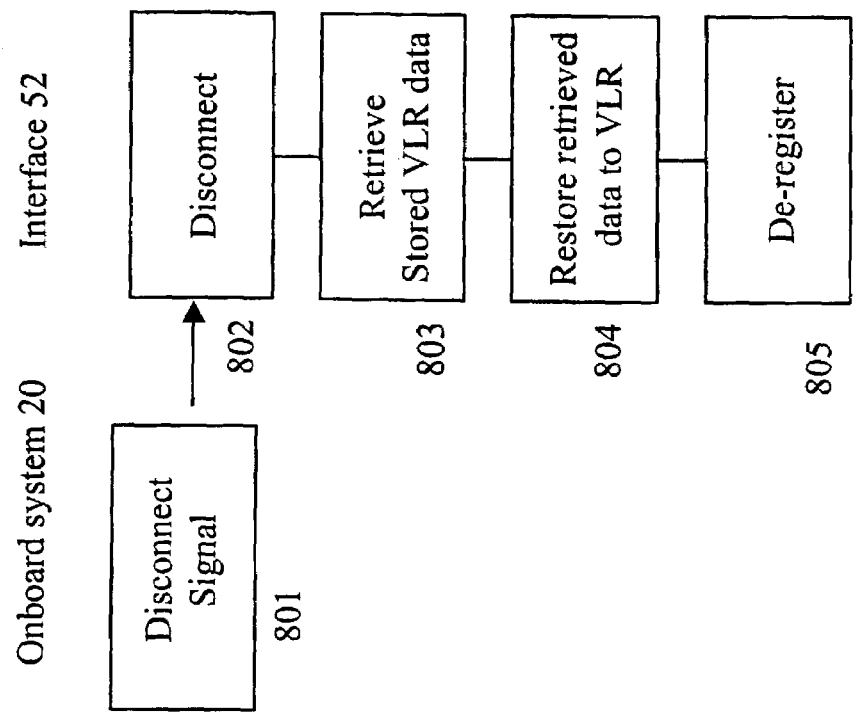
Figure 8

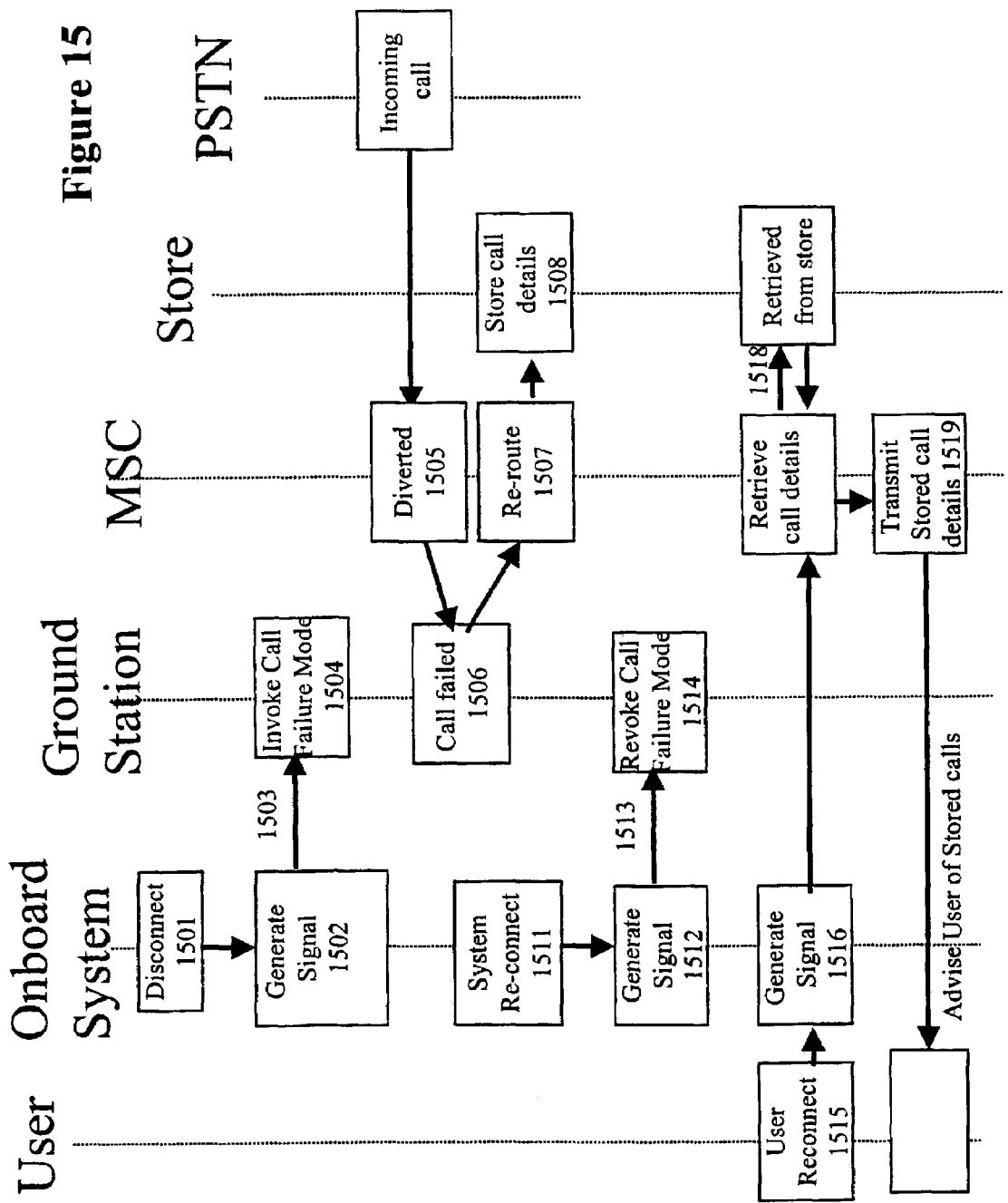

MOBILE TELEPHONY

This invention relates to mobile telephony, and in particular to systems for use on board vehicles.

There has been considerable activity in recent years in proposals to allow the use of mobile telephones in environments where conventional cellular telephony base stations cannot provide coverage, in particular on board ships and aircraft. These vehicles frequently travel beyond the range of land-based cellular base stations, which typically have a range of the order of 1 to 10 km.

There are also circumstances when temporary provision of cellular telephone facilities is required at a remote location where such facilities are not normally available, or are temporarily unavailable, for example when the fixed infrastructure has been damaged by a natural disaster.

There are a number of special difficulties to be addressed if a standard cellular telephone is to be used in an aircraft. Firstly, many cellular base stations have antennas arranged for maximum gain in the horizontal plane, so an airborne cellular telephone may not be able to obtain a signal from any base station, even when flying over land served by a cellular base station network. If the range of the base stations does extend to the normal flying height of aircraft, frequency re-use patterns, which allow several base stations to use the same radio frequencies without interference, are designed on the assumption that a mobile unit served by one base station is not able to exchange radio signals with other base stations using the same frequency. This assumption ceases to be valid if a mobile unit is several thousand meters above the ground, since it may be in line-of-sight of a large number of base stations simultaneously. Moreover, although reliable handover of a mobile unit can be achieved from moving vehicles travelling at speeds of up to 200 km/h, a typical passenger aircraft travels at speeds approaching 1000 km/h. Airlines also impose restrictions on the use of powerful radio signals on board, as a precaution against possible interference with the aircraft's electronic systems.

For truly global coverage, satellite telephones are available. However, these are expensive and much heavier than a cellular telephone. Both cellular telephones and satellite telephones also suffer from the screening effect of being inside a metal hulled vehicle. As with cellular telephones, the unrestricted use of a portable satellite telephone within an aircraft may be prohibited.

A user without his own satellite telephone may use special facilities provided on board, such as the service provided to several airlines by the applicant company under the Registered Trade Mark "Skyphone". This uses onboard terminals connected, through a satellite link between the aircraft and a satellite ground station, to the telephone network. Another system, TFTS (terrestrial flight telephony system, marketed as "Jetphone"), operates in a similar manner, but uses a direct link between the aircraft and the ground station, without a satellite link. Similar systems are provided on board ships. However payment for these services is generally at the point of use (or prepaid), and may be in a foreign currency. Calls made to the user's cellular telephone will not be successful unless the calls can be diverted to the telephone number of the onboard user terminal (which will generally not be known to the caller), and any special facilities offered by the user's cellular network will in general be unavailable. A user with his own cellular telephone account which, through "roaming" agreements between network operators, can be used in many different countries, would therefore prefer to continue to use his cellular telephone subscription when travelling within or between these countries on board an aircraft or other vehicle.

Proposals have been made, for example EP0915577 (Rohde & Schwartz) for a facility which would allow cellular telephones to make outgoing calls by way of the aircraft's own onboard telephone system. This allows the aircraft's onboard systems to impose power control on the mobile units and ensure that their radio transmissions are kept within safe limits. However, the cellular telephone is not directly connected to the cellular network, so conventional cellular radio location update processes cannot be used to inform the user's home network of its current location and allow incoming calls to be routed to the telephone.

Proposals have also been made to allow a user to use his own cellular radio identity when using the satellite facility, instead of a special identity under the satellite system. This would allow billing to be made through the user's normal cellular radio account, and would also allow incoming calls made to his cellular telephone number to be received whilst travelling. To this end, systems have been developed which allow call diversions to be set up to allow calls made to the user's cellular number to be transferred to a destination node of the tracking radio system. The destination node may be an onboard handset temporarily allocated the user's cellular identity, or it may be an onboard base station capable of wireless connection to the user's own cellular telephone. Systems of this general kind have been disclosed in International Patent Applications WO99/12227 (Nokia), WO94/28684 (Nordictel) and WO98/26521 (Ericsson); European Patent Applications 0920147 (Alcatel) and 0915577 (Rohde & Schwartz), and United Kingdom Patent Application 2310973 (Motorola). An onboard base station can be integrated with other onboard systems, allowing local control of the base station's transmitter, and those of the mobile units with which it is co-operating, so as to keep their power within permitted limits.

This is made possible by an invention disclosed in the International application filed on the same date as the present application, with applicant's reference A25823 and priority date $14^{th}$ Sep. 1999, which provides apparatus for enabling a termination point of a first telecommunications system to initiate call diversion instructions in the switching system of a second telecommunications system such that calls initially directed to a telephone apparatus usable with the second telecommunications system are diverted to the said termination point in the first telecommunications system, the apparatus comprising means in the first telecommunications system for identifying the telephone apparatus from which calls are to be diverted and the termination point to which calls are to be diverted, and an interface means between the first telecommunications system and the switching system of the second telecommunications system, the interface means comprising:

means to indicate to the switching system that the telephone apparatus is in a specified operating condition, irrespective of the true operating condition of the telephone apparatus, and means to generate an instruction to the switching system to divert calls, intended for the telephone apparatus, to the said termination point of the first telecommunications system when the telephone apparatus is indicated as being in the said predetermined operating condition.

In the preferred arrangement the first and second telecommunications systems are a satellite telephone system and a cellular telephone system respectively, the identification information being a user identity associated with the telephone apparatus, and the network address of the termination point.

Other aspects of the invention disclosed in the aforementioned International patent application provide the novel features of each of the individual telecommunications systems which co-operate to form the complete system, and methods of operation of these individual co-operating systems and of the complete process.

A second arrangement, disclosed in the applicant's International Patent Application having the same filing date as the present application and the applicant's case reference A25937, claiming the priority date $25^{th}$ Aug. 1999, has apparatus for providing telephone connection between one or more cellular radio telephones and a fixed cellular radio switching system, comprising a moveable cellular system on board a vehicle, a fixed cellular radio switching system, and a tracking radio link providing radio connection between the moveable cellular switching system and the fixed cellular switching system, the moveable cellular system comprising a moveable telephone switching system connected to one or more base transceiver stations for providing radio connection with the cellular radio telephones, and having means for initiating a control call over the tracking radio link to the fixed cellular radio switching system in response to the detection of the presence of a cellular radio telephone in the area of coverage of base transceiver stations, and the fixed cellular radio switching system having registration means responsive to such control calls to indicate to other switching systems that calls to a cellular radio telephone currently served by the moveable switching system should be initially directed to the fixed cellular radio switching system, the fixed cellular radio switching system also having call diversion means responsive to such control calls to allow incoming calls directed to the cellular radio telephone to be diverted to the moveable cellular switching system by way of the tracking radio link. In the embodiment described in that application, the movable system has means for generating an association between a destination node of the tracking radio link and an identity code of a cellular radio telephone, and means for storing the said associated identities in stores associated with the fixed and moveable cellular switching systems, thereby allowing both cellular radio switching systems to translate between the cellular radio identity and the node identity. The apparatus is arranged such that calls directed to a cellular telephone currently co-operating with the moveable switching cellular system are diverted by the fixed cellular switching system to a node of the tracking radio system having the identity associated with the cellular radio identity, the node having means for connecting the call to the moveable cellular switching system and the moveable switching system having means for retrieving the cellular network identity associated with the node and routing the call to the cellular telephone having that identity.

In the cellular telephone systems described in the aforementioned International Patent applications the interface units are arranged to appear to the switching system as a typical radio base station control system, to which the mobile handset is currently working, although in fact no radio base stations are actually controlled by it. This interface unit may therefore be considered to be a "Virtual" Base Site Controller. The switching system itself requires no modification: it merely registers that the user is working to the "Virtual" Base Site Controller and stores the user details in its "Visitor Location Register" (VLR), in the same way as it would for a mobile unit working to any real base site controller to which it is connected. The interface unit also generates a call diversion instruction, which will appear to the switching system to have come from the mobile handset, by way of the "Virtual" Base Site Controller. This call diversion instruction is set up in the switching system such that if the "Virtual" Base Site Controller responds to a call request directed to the mobile unit with a "busy line" response (or some other specified condition), calls are to be diverted, through normal network interconnects, to a specified directory number, namely that of the satellite termination point to which the user is connected. The interface unit does not in fact monitor the real condition of the user terminal, (which is not operatively connected to the interface unit), but instead always returns the "line busy" signal to the switching system.

The interface unit includes a store to record any diversion settings existing for the telephone apparatus prior to the diversion to the second network being set up. This allows these settings to be retrieved when the user disconnects from the first telecommunications system, so that they can be reinstated in the switching system of the second telecommunications system, or transferred to another telecommunications system, when the telephone apparatus makes contact with a real radio base station, thereby initiating a handover procedure from the "Virtual" Base Site Controller to the real one.

Should a second call attempt to the user's cellular telephone be made whilst a call is in progress to the onboard system, the switching system may be arranged to divert it to another predetermined number, such as the user's "voicemail", or automatic answering service, address.

If the user termination is in an aircraft or other vehicle connected to a ground station (by satellite or otherwise), it may move from the area covered by one satellite (or ground station) to that of another. In that case, the network address of the termination changes. To accommodate this, the interface may be provided with means to store the address of termination points in the first system, means to record changes to the said addresses transmitted to it from the first system, and means to modify the diversion instruction in the switching system when such a change takes place. Alternatively, the termination point may be arranged simply to repeat the set-up process, causing the mobile unit to be re-registered with the interface unit, (which will not be apparent to the switching system, as it will perceive the same "virtual" base site controller), and to transmit a new call divert instruction to the revised address of the termination point.

The inventions disclosed in the aforementioned International patent applications allow the diversion of PSTN-compatible speech calls to the user's current location in the first telecommunications network. However, modern cellular telephone systems have other capabilities, in particular the data system known in the GSM standard as "Short Message Service" (SMS). In the cellular network data messages are carried over a separate data network and cannot be diverted to a different directory number, such as that of the user's current satellite terminal, or the satellite address currently associated with the user's terminal, in the same way as voice calls because the PSTN cannot handle them. Moreover, with regard to arrangements in which the call is routed to a standard satellite telephone terminal as provided in aircraft, such terminals are not equipped to receive such messages.

A first aspect of the present invention provides a method of converting data messages originally formatted for transmission over a first telecommunications network for generation of a display on a display unit of a first type, such that messages can be transmitted over another telecommunications network for display by a selected display unit of a second type forming part of a server-based information display system, wherein the address information in the original data message is replaced by address information appropriate to the selected display unit to generate an amended data message, and a new data message is created, addressed to the server of the information display system and having the amended data message as payload, and wherein the server converts the amended data message into control instructions suitable to display the information content of the data message on the information display unit identified in the amended data message.

A second aspect provides apparatus for converting data messages originally formatted for transmission over a first telecommunications network for generation of a display on a display unit of a first type, such that messages can be transmitted over another telecommunications network for display by a selected display unit of a second type forming part of a server-based information display system, comprising means for replacing the address information in the original data message by address information appropriate to the selected display unit to generate an amended data message, and means for creating a new data message addressed to the server of the information display system and having the amended data message as payload.

A third aspect provides server apparatus forming part of a server-based information display system for receiving messages generated by the apparatus defined above, for display by a selected display unit, the server comprising means for converting a data message formatted for display on a display unit of a first type into control instructions suitable to display the information content of the data message on an information display unit of a second type controlled by the server, the information display unit being identified in the data message In the described embodiment the data message is originally formatted for transmission over a cellular telephone network for display by a cellular telephone handset. The data message may be generated by the cellular switching system in response to a message being deposited in a call answering system.

In one arrangement, prior to transmission of the amended original data message to the server an alerting data message is created, indicative of the presence of the original data message, addressed to the server of the information display system, and carrying address information appropriate to the selected display unit, thereby causing the server to generate control instructions suitable to display an alerting message on the information display unit so identified, and wherein the amended original data message is forwarded to the server in response to an instruction from a termination point associated with the destination display unit. This ensures that data messages are only transmitted when the user has accepted them, thus allowing the network operator to charge the user for the service.

The amended data message may also include password data, the server being arranged such that when it receives a data message it causes the display means to indicate the presence of a data message, and displays the data message only if it receives a predetermined input from a user terminal associated with the display means.

Embodiments of the invention will now be described with reference to the Figures, in which:

FIG. 1 is a schematic diagram showing the functional relationships between the systems which co-operate to form one embodiment of the invention FIG. 2 is a more detailed schematic diagram of the network termination and associated card reading equipment, which for illustrative purposes will be assumed to be on board an aircraft FIG. 3 is a diagram showing part of an alternative arrangement of network termination, arranged for co-operation with a cellular telephone handset FIG. 4 is a schematic diagram showing the functional relationships between the components of the fixed part of the first telecommunications system which co-operate in the invention, FIG. 5 is a schematic diagram of the switching system, interface unit, and associated parts of the second telecommunications system;

FIG. 6 is a flow chart showing the process by which a diversion is set up in the second network to a termination connected to the first network FIG. 7 is a flow chart showing the process by which a call coming in to the second network is connected to a telephone connected to the first network FIG. 8 is a flow chart showing the process by which the second network restores the original settings for a telephone when it disconnects from the first network.

FIG. 9 illustrates the forwarding process implemented to a data message.

FIG. 11 shows the moveable vehicle-borne parts and FIG. 12 the fixed, ground based, parts.

FIG. 15 is a flow chart showing a call diversion process, for use when the system has to be temporarily shut down.

The following embodiments illustrate the invention using a standard switched cellular network, using the terminology of the "GSM" standard for illustrative purposes. However, the invention is applicable to other cellular networks, including packet networks, which are used to carry data over a distributed computer network such as the "Internet", carrying messages using formats such as the "Internet Protocol" (IP). Thus, unless the context clearly demands otherwise, any reference in this specification to switching includes the equivalent routing functions in a packet network of this kind.

Figure 1:
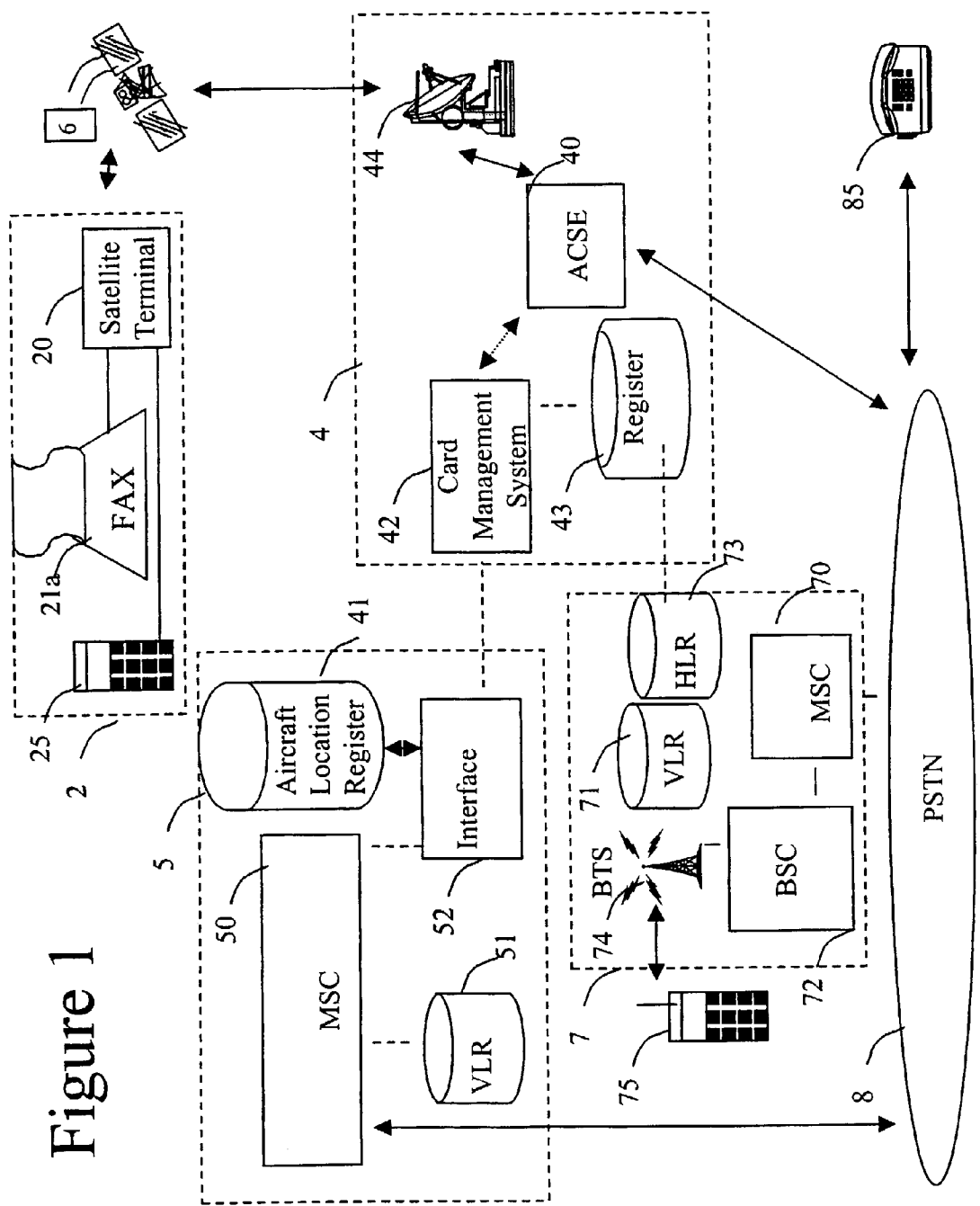

FIG. 1 shows the general arrangement of the various components which co-operate in this embodiment. Note that traffic links (which can carry speech, data, etc) are shown as full lines, signalling links used only for call set up are shown as broken lines.

Figure 2:
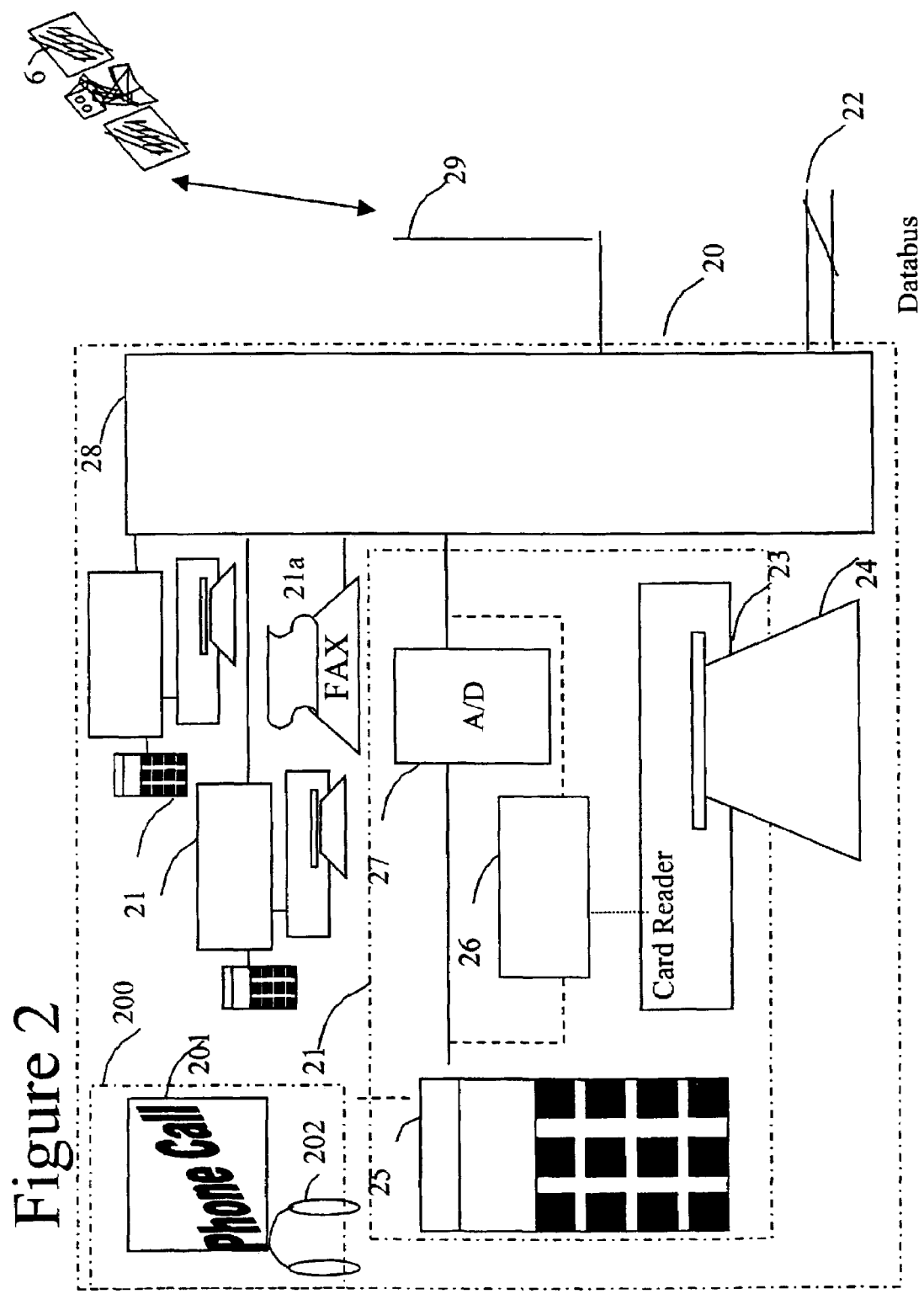
Figure 3:
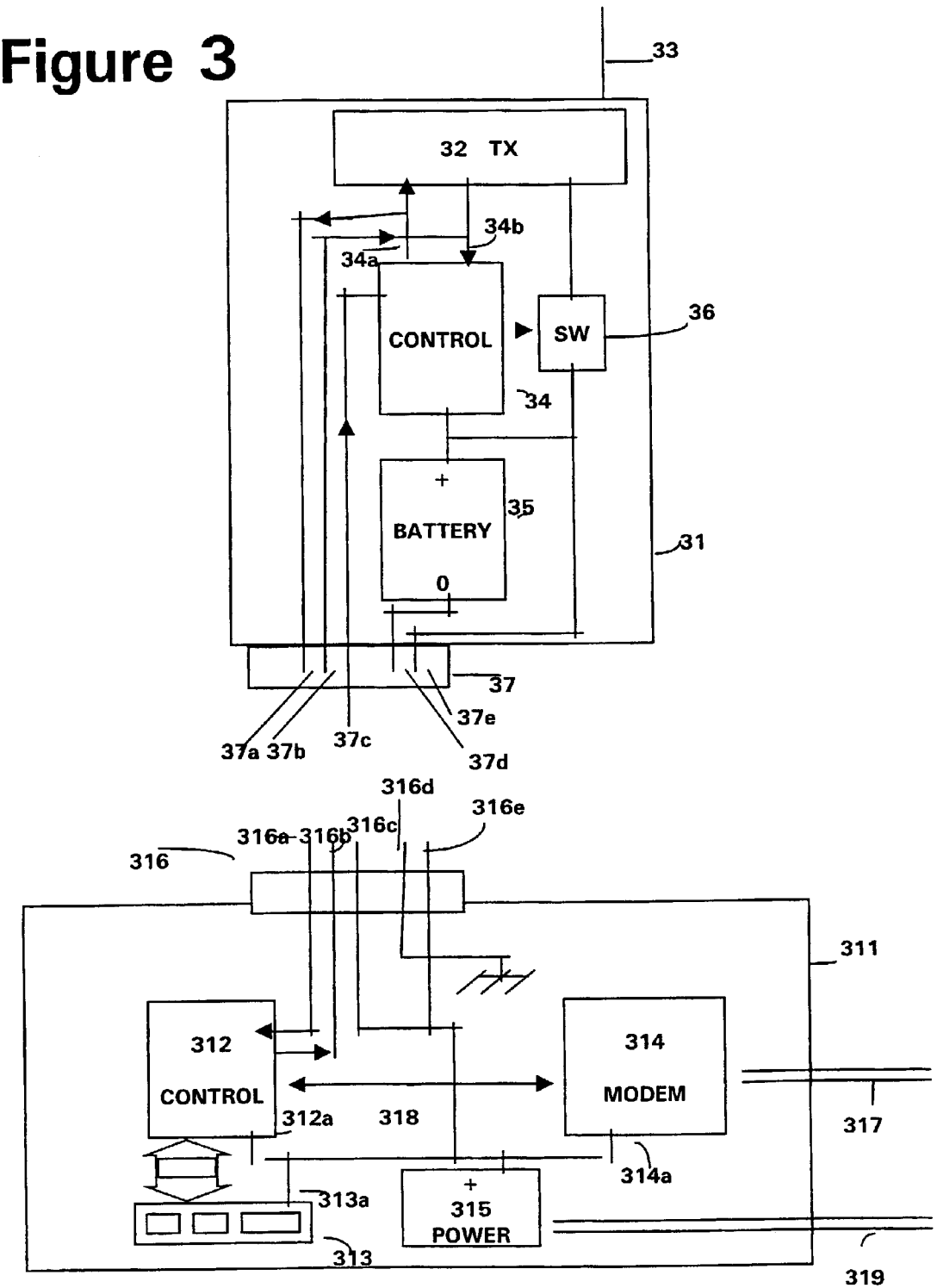

The onboard part 2 (shown in more detail in FIG. 2) comprises one or more handsets 25 (which, in the alternative arrangement of FIG. 3, are the users' own cellular telephone handsets 31), connected to a termination point 20 of the satellite network. The termination point 20 is in communication with a ground station 4, shown in more detail in FIG. 4. In this embodiment, the communication link is made through an earth-orbiting satellite 6.

The principal components of the ground station 4 relevant to this invention are an antenna 44 which communicates, by way of the satellite 6, with the onboard system 2, an Access Control and Signalling Equipment (ACSE) 40 which carries out call switching functions to allow calls to be placed through the public switched telephone network (PSTN) 8 to other telephones 85, and a Card Management System 42 which authorizes the use of an individual terminal 25 according to user identities entered with respect to that terminal. There is also a register 43 of card identities, to provide a correspondence between the user identities used by the satellite terminal and the corresponding cellular telephone user identities (not necessary if the cellular telephone identity is read directly by the terminal 20, as will be described with reference to FIG. 3), and to provide billing information.

Figure 5:
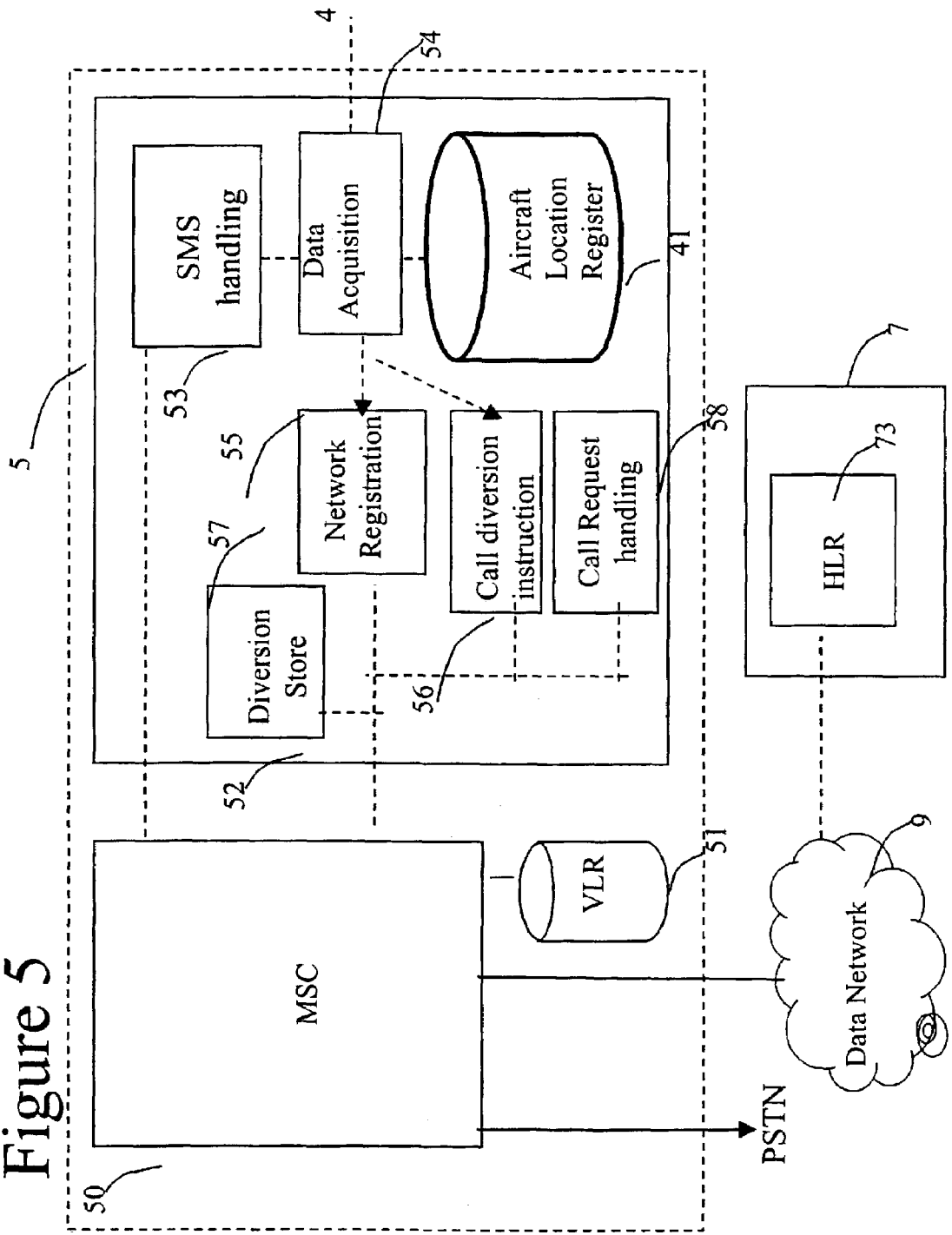

The card management system 42 interacts with an interface unit 52 of a "host" cellular telephone network 5, shown in more detail in FIG. 5. This network 5 is connected to the public switched telephone network (PSTN) 8 and to other cellular networks 7 through a switching centre 50. Associated with the interface unit 52 there is an "aircraft location register" 41 which monitors the terminals currently served by each individual satellite, and modifies the functioning of the interface unit 52 when a terminal 20, for example on board an aircraft 2, moves from the coverage area of one satellite 6 (and its ground station 44) to another.

The cellular network 7 illustrates in simplified form the system architecture of a "GSM"-standard cellular radio system, and the terminology used in this standard. The network 7 has a switching system (MSC) 70 to allow connection of one or more base transceiver sites (BTS) 74, through one or more base site control systems 72, to the PSTN 8 and thus to other telephones 85. A mobile telephone 75 may establish radio contact with one of the base stations 74 in order to make and receive telephone calls. The network 7 also includes a "Visitor Location Register" 71, which maintains details of those cellular telephones 75 currently co-operating with the network 7. Mobile telephones according to the "GSM" standard are capable of co-operating with different networks ("roaming" between networks). To allow this to take place, when a mobile telephone 75 changes from one network to another, the network to which it has moved retrieves data from a "Home Location Register" 73 permanently associated with the handset 75. The network 7 in which the Home Location Register 73 associated with a given handset is to be found is identifiable from the handset's identity code. The Home Location Register also records the identity of the network 7 with which the mobile handset 75 is currently operating.

The "host" network 5 operates like conventional cellular network, but is provided with an interface unit 52, which interacts with the mobile switching centre 50 as a base site controller would. This interface unit 52 may be in addition to one or more base site controllers (not shown). The interface unit does not interact with any base transceiver sites or mobile handsets, but obtains user details (in particular the identity of a mobile handset) from the card management system 42 to allow it to appear to the switching centre 50, and the HLR 73 in the user's home network, that it is in radio communication with a mobile handset 25. It can then control the call forwarding instructions stored in the host network's VLR 51, to cause incoming calls directed to that handset to be diverted, through the switching system 40 of the satellite network 4, to the satellite terminal 20.

Figure 4:
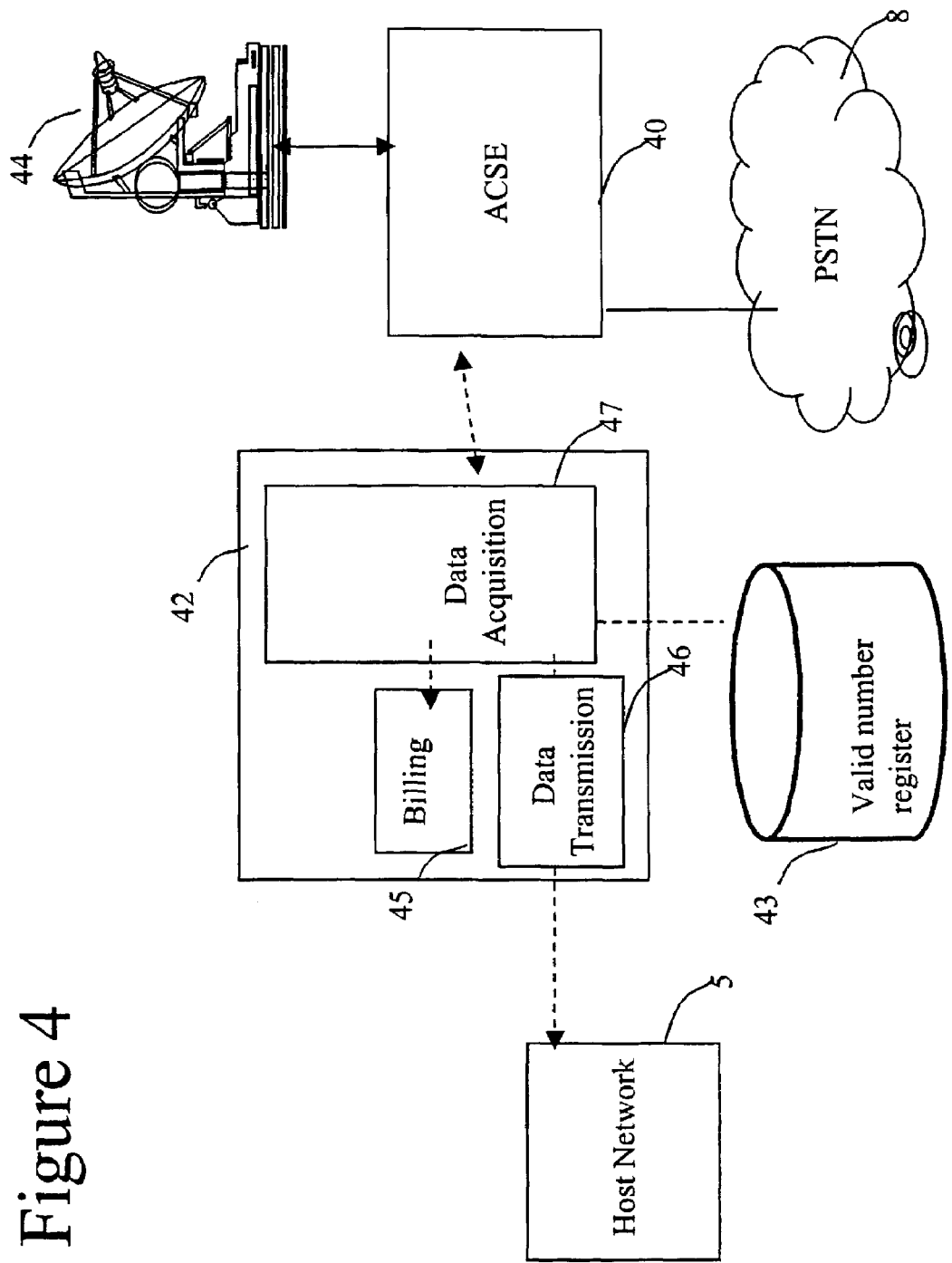

FIGS. 2, 3 and 4 illustrate a first embodiment of the invention, applied to a satellite telephone system such as that provided by the applicant company under the Registered Trade Mark "Skyphone". FIG. 2 shows a first embodiment of the mobile part which has a standard card reader, whilst FIG. 3 shows an alternative arrangement which allows a user to use his cellular telephone handset. FIG. 4 shows the ground station.

The onboard system 20 shown in FIG. 2 comprises a plurality of user terminals 21, 21*a* (only one shown in detail), connected by a multiplex and radio interface unit 28 to an antenna 29 which provides radio communication with a satellite 6. Each user terminal 21 has a card reading unit 23 into which an intending user can insert a card 24 or other data carrier providing user identification data. The data may give details of the user's credit card account, or a special account for the use of the onboard telephone service. The card reader 23 may be adapted to read the SIM (Subscriber Identity Module) of a GSM-standard cellular telephone. (It should be noted that one variant of the method according to the invention does not make use of the card reading apparatus 23,24,26, although it may nevertheless be present for use by other customers of the satellite system).

Further user terminals 21*a* may be set aside for non-voice applications, for example an onboard facsimile machine.

The user handset 25 provides the usual keypad, microphone and earphone to allow the user to make telephone calls. The user handset 25 and the card reader 23 are both connected to a processor 26 which converts data read from the card 24, and keystrokes input from the handset 25, into data signals for transmission over the radio link 29. It also provides identification data indicative of which of the terminals 21 it is. A further processor 27 performs analogue/digital conversion of speech signals from the handset 25.

The digitised signals from each terminal 21 are multiplexed and modulated onto a radio carrier in a interface unit 28, and transmitted from the antenna 29.

The antenna 29 also receives signals which are demodulated and demultiplexed in the unit 28. Data signals are processed in the processor 26, whilst digitised speech is converted to analogue speech in the analogue/digital converter 27 and fed to the handset 25.

The interface unit 28 also includes a connection to the data bus 22 of the aircraft 2 giving access to aircraft parameters such as undercarriage deployment, "weight-on-wheels", time to destination, altitude, etc. When a predetermined condition indicative of the impending end of a flight is met, the interface unit 28 transmits a signal to the ground station to cause a deregistration signal to be transmitted to the card management system 42.

Because the onboard telephone system was originally designed for making outgoing calls, the handsets 25 provided in existing terminals 21 are not equipped with a suitable call alerting device. The handsets 25 could be modified to provide a buzzer or light to alert the user to an incoming call. Alternatively, to avoid distracting other passengers on the aircraft, the telephone terminal 21 may be connected to an at-seat entertainment system 200, to provide an alert either through the earpieces 202 or on the screen 201.

Instead of the terminals 25, an alternative arrangement may be used as shown in FIG. 3. In this arrangement each onboard terminal 25 is replaced by an onboard interface device 311 to which a user's own mobile radio telephone 31 can be connected electrically, thereby allowing the mobile telephone to be used without using its radio antenna. It is a modification of the system described in the applicant company's International Patent Application WO97/36442, published on $2^{nd}$ Oct. 1997, to which the reader is referred for further details. In this modified version a GSM (Global System for Mobile communication) mobile telephone 31 comprises r.f. transceiver circuitry 32 coupled to an antenna 33, base band signal processing and control circuitry 34, a rechargeable battery pack 35, a switch 36 and a socket 37. The processing and control circuitry 34 has a data output terminal 34a coupled to both the r.f. transceiver circuitry 32 and a first contact 37a of the socket 37. A data input terminal 34b of the processing and control circuitry 34 is coupled to the r.f. circuitry 32 and a second contact 37b of the socket 37. A third contact 37c of the socket 37 is coupled to a control input of the processing and control circuitry 34. Fourth and fifth contacts 37d, 37e of the socket 37, which are respectively for 0V and +V power supply lines, power the telephone 31, and may also be arranged to recharge its batteries 35. The +V terminal of the battery pack 35 is also connected to the processing and control circuitry 34 and to an input terminal of the switch 36. The output terminal of the switch 36 is coupled to a +V input terminal of the r.f. circuitry 32. A control terminal of the switch 36 is coupled to an output of the processing and control circuitry 34.

The interface unit 311 comprises a control circuit 312, a user input unit 313, including a keypad and a display, a V.24 33.6 kbit/s modem 314, a power supply unit 315 and a plug 316. The plug 316 has five contacts 316a-316e which correspond to contacts 37a-37e of the socket 37 of the mobile telephone 31. The first contact 316a of the plug 316 is coupled to a data input terminal of the control circuit 312 and the second contact 316b of the plug 316 is coupled to a data output terminal of the control circuit 312. A bi-directional serial link 318 is provided between the control circuit 312 and the modem 314 for modem control and data signals. The third contact 316c and fifth contact 316e of the plug 316 are coupled to the +V output of the power supply unit 315. The fourth contact 316d of the plug 316 is coupled to the interface unit's 0V supply wiring. The user input unit 313 is coupled to the control circuit 312 for the input of user commands and the output of display control signals from the control unit 312 to the user input unit 313. The +V output of the power supply unit 315 is also coupled to +V input terminals 312a, 313a, 314a of the control circuit 312, the user input unit 313 and the modem 314. The modem 314 is coupled to a telephone line 317 and the power supply unit 315 is arranged to receive power from an electricity supply 319.

When the user wishes to connect to the interface unit 311, he connects the plug 316 of the interface unit 311 to the socket 37 on his telephone 31 by a cable (not shown). The voltage on the third contact 37c of the socket 37 is detected by the processing and control circuitry 34 which thereby determines that the telephone 31 has been connected to the interface unit 311. The connection of the battery 35 to the power supply 315 by way of the connections 37d/316d and 37e/316e also allows the battery to be recharged.

Once the processing and control circuitry 34 has determined that the telephone 31 has been connected to the interface unit 311, it sends a control signal to the switch 36, causing it to open, isolating the r.f. circuitry 32 from the battery pack 35 and the power supply 315 in the interface unit 311. The processing and control circuitry 34 also responds to the voltage on the third contact 37c of the socket 37 by selecting alternative control programs or constant data to allow for delays in the signal path from the telephone 31 to the controller 30 which are caused by the use of the satellite link 6 and the modems 314, 32.

In this arrangement, instead of the need for a separate card reader 23, the telephone 31 identifies itself to the telephone network 40/42 by generating its terminal identity code (IMSI in the case of a GSM telephone). The registration signal is not transmitted from the antenna 3 because the r.f. circuitry 32 is disabled. Instead, it is output to the interface unit 311 via the first contacts 37a, 316a of the socket 37 and plug 316

The operation of this onboard system will now be described with reference to FIG. 6. When the card reader 23 or interface unit 311 detects the presence of a card 24 or handset 31 respectively, (step 601) it generates a prompt to indicate to the user that he may wish to have calls diverted to the onboard system. If the user requires this service, he enters a code on the keypad of the handset 25, 31 which causes a divert request to be generated (step 602). The details from the card 23 (or SIM of the handset 31) are then passed to the processor 26 which also provides the identity of the terminal 21 (step 603) and transmits the data to the interface unit 28.

Alternatively, these steps (602, 603) may be activated by the user without a card, by dialing an access code (divert request 602) followed by further keystrokes to identify the account to be used (terminal identity step 603). These keystrokes may include the user's MSISDN (which, as his own directory number would be known to him). To prevent misuse of the system by unauthorised personnel, a security code (Personal Identification Number: "PIN") may be added. This code may have been issued previously to the user, or the user may request such a code by making a call using the satellite system to his home network's customer service department and providing personal details to the operator to prove his identity.

The user may select for the identity of a terminal 21a other than his own at seat terminal 21 to be selected as the destination for incoming calls. For example, if his MSISDN code (or one of them) relates to a facsimile machine having cellular capability, he may request that incoming calls to that number be directed to an onboard facsimile machine 21a.

The data received by the interface unit 28 is then transmitted to the ground station 4 (step 604). The further steps (605-615) in the process are carried out by the co-operating networks 4, 5 and will be described later.

If the user decides that he no longer wishes to have his calls diverted to the terminal 21, he may cancel the diversion instruction by entering a special code on the keypad of the handset 25, 31. Disconnect codes may also be generated in the interface unit 28 for all the termination points 21, either by the cabin crew or automatically in response to a signal detected on the aircraft's data bus 22 which is indicative of the imminent end of the journey, such as undercarriage deployment, weight on wheels, low altitude, or time remaining to destination as determined by the aircraft's flight management system. The disconnect instruction is transmitted (step 801, FIG. 8) by way of the switching system 40 in the ground station 4, to the interface unit 52 whose operation (steps 802 to 805) will be described later.

The Ground Station 4 shown in FIG. 4 has a radio antenna system 44 for communicating with the terminal 20, through a satellite link 6 or otherwise. Signals are handled by an Access Control Signalling Equipment (ACSE) 40 which carries out switching functions to route calls to or from the public switched telephone network (PSTN) 8.

A card management system 42 comprises a data acquisition unit 47 which reads data transmitted from the card reader 24, and/or keyed in by the user, to identify the type of user, confirm the user's account details and arrange billing for any calls made, through a billing system 45 which raises invoices, or interacts with the systems of a credit card operator or bank.

In the existing onboard systems a user cannot receive calls, unless the caller knows the unique "AES" number of the handset 21, 21*a*. This is unlikely, as the number depends on the identity of the aircraft, the seat, and the serving satellite or base station.

The equipment just described is augmented in the present embodiment by an interface 46 with the host network 5, and through that to the Home Location Register 73 of each network 7 (FIG. 1) whose subscribers are to be given access to the service, which stores a concordance between the card identities and the card-holder's cellular radio telephone number (MSISDN: mobile systems integrated services data network number), on request from the data acquisition unit 47, which is arranged to recognise the card identities which require such translation. In a preferred embodiment the concordance is supplied to a register 43 in the ground station by the operator of user's home network 7, when the network operator provides the user with the card. The operator of the home network 7 also records the concordance in its own Home Location Register 73. This arrangement allows the existing card readers 23 to be used on board the aircraft, without modification. If the users' mobile subscriber identities are supplied from the onboard system, either by reading the identity (reader 311) or by the user keying it in, the store 43 can be used for verification, or omitted. Billing information is also returned to the user's home network 7.

The operation of the ground station 4 will now be described with reference to FIG. 6. The data acquisition unit 47 receives the card details from the reader 23 (see steps 601 to 604 already discussed) and if it identifies as those details as corresponding to a cellular user (step 605), it retrieves the cellular user identity from the store 43 containing this concordance, or from the HLR 73 of the user's home network, (step 606). (This step can be omitted if the user's mobile network identity is provided by the onboard apparatus 20).

The data transmission unit 46 then generates a signal for transmission of the cellular user identity, together with the identity of the terminal 21, to the cellular network 5 acting as host to the interface (step 607). This host network 5 will, in general, not be the same as the user's home network 7. The further steps (608 to 615) in this process will be described later, with reference to FIG. 5.

If a cancellation signal is received from the aircraft in respect of a given terminal 21, (step 801, previously discussed) the data transmission unit 46 transmits a "cancellation" signal to the host network 5. As already discussed, the cancellation signal may be generated either for an individual handset 21, by its user dialing a special code, or for all handsets as the result signals received by the radio interface unit 28 over the aircraft's data bus 22 indicative of the imminent end of the flight.

An embodiment of the host network 5 of the invention is shown in FIG. 5. Its operation will be discussed with reference to FIGS. 6, 7 and 8. In this network 5 an interface unit 52 is provided, which is arranged to appear to the switching system 50 as if it is a normal base station of the cellular radio system.

Figure 6:
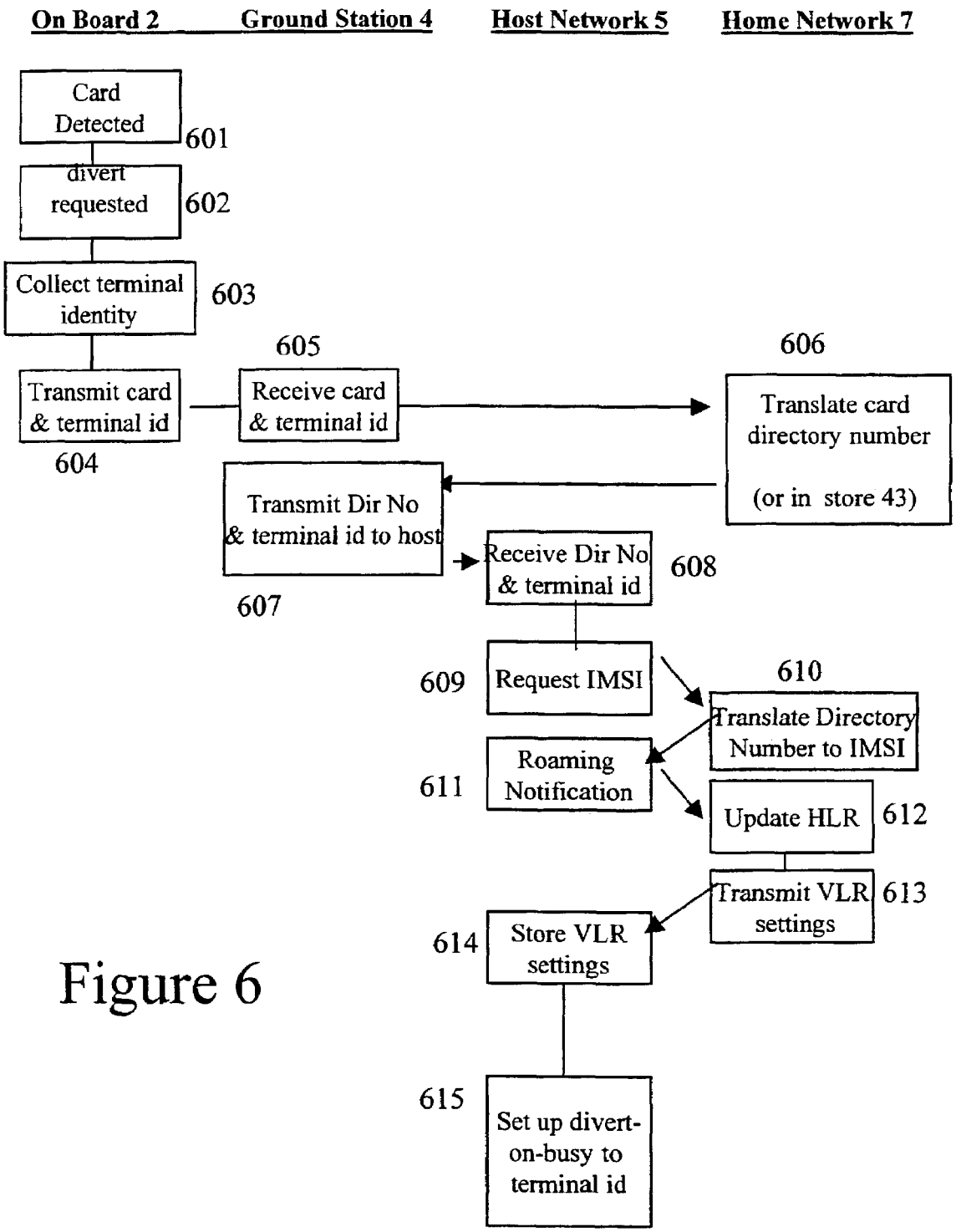
Figure 7:
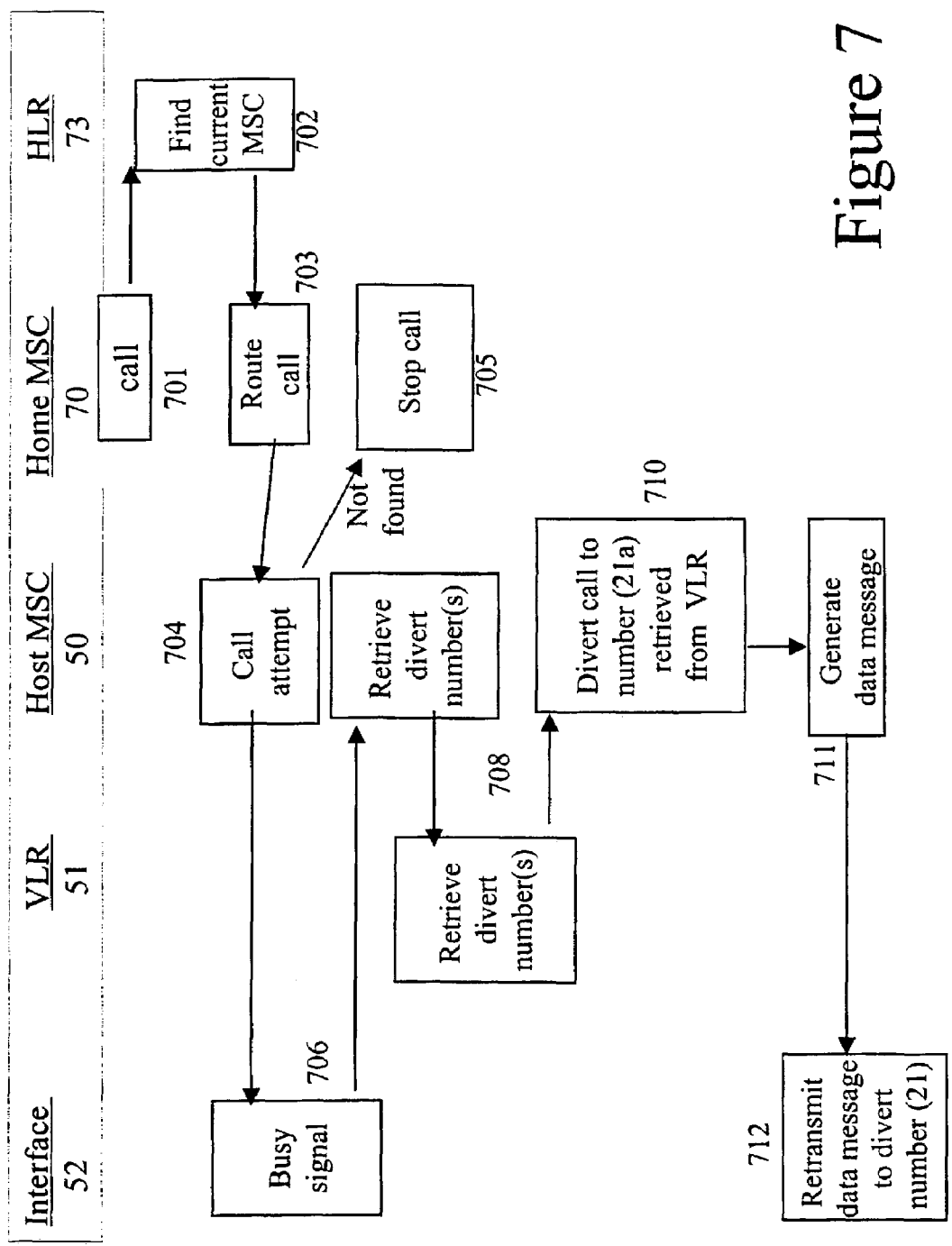

In order to do this, the interface unit 52 is provided with a data acquisition unit 54 which receives from the card management system 42 of the ground station 4 the identity of the cellular telephone it is to represent, and the AES identity of the onboard terminal 20 (step 608, FIG. 6). Mobile telephones have three identification codes: the equipment identity (IMEI, which will not be discussed further here), the directory number (MSISDN) and the actual SIM identity (IMSI). In practice, for security reasons, the IMSI is not made generally known, and a user is normally identified by his MSISDN unless the SIM itself is used. If the SIM is used in the card reader 23, or the user's telephone is used in the arrangement of FIG. 3, (in which case no concordance is required) the IMSI can be read directly from the data received by the data acquisition unit 54. However, if the user keys in his own identification data (step 603), or a concordance is provided by the card reader 23, the data acquisition unit will receive the MSISDN, and not the IMSI. (There may also be a PIN or other security code, which is checked by the data acquisition unit 54).

In the GSM standard it is possible to obtain an IMSI if the MSISDN is known by interrogating the appropriate Home Location Register 73. To do this, the interface unit 52 transmits a "request for routing information" signal, using the MSISDN (step 609). The standard HLR 73 responds to such a request with a signal which includes the IMSI corresponding to the MSISDN in the request (step 610).

(The "request for routing information" signal was provided under the GSM standard as a means of obtaining routing information for data messages intended for a destination for which only the MSISDN number is known. However, it may be used for other purposes, such as that described above).

The telephone identity (IMSI), whether obtained directly from the card reader 23 or handset 31, or indirectly as just described, is passed to a network registration unit 55 which exchanges signals with the mobile switching centre 50 in the same way that a real cellular telephone would do. The mobile switching centre therefore informs the user's Home Location Register 73 that the mobile telephone is now registered with the network 5 (step 611). The Home Location Register 73 records that the mobile handset is now registered with host MSC 50 (step 612).

It should be noted that, although registered with the host MSC 50, the user's mobile handset is not operatively connected to the host MSC 50—in fact the mobile handset may be switched off to allow the card 24 to be used, or it may be connected to a user terminal 311. The user may be in an aircraft, anywhere in the world within the coverage area of the satellite network.

The user's details, including any diversion instructions, are sent by the Home Location Register 73 to the network's VLR 51 (step 613). A store 57 records a copy of the details of these diversion instructions (step 614).

Conventionally, any incoming calls for a mobile user are sent in the first instance to the user's home network 7, and the HLR 73 provides information to identify the MSC 50 where the mobile handset can currently be found. Consequently, in the present arrangement, any incoming calls intended for the mobile user will now be directed to the network 5, as the mobile user is currently registered there.

The data acquisition unit 54 in the interface 52 now passes the directory number of the termination point 21 to a call diversion instruction unit 56, which generates a "divert on busy" instruction to the VLR 51 (step 615). This is a standard divert arrangement, and operates such that should the mobile unit appear to be engaged on another call when a call attempt is made to it, the call attempt is diverted to a specified directory number, in this case the termination point 21 or 21*a*, identified by its AES code. This diversion instruction replaces any previous instruction held in the VLR 51. Further settings may be made in the call diversion instruction unit 56, such as the identification of a termination point 21 to which a data message is to be sent when a call is diverted to another termination point 21*a*.

Of course, there is in fact no mobile telephone connected to the interface unit 52, and therefore it is unable to connect incoming calls to the mobile telephone in the conventional way, or to identify the current true operating condition (switched off, busy, ready for calls, etc) of the mobile handset. Instead, the system responds to a call attempt as will now be described with reference to FIG. 7.

When a call attempt is made (step 701), the home MSC 70 to which the call is initially routed obtains from the HLR 73 the current location of the mobile telephone (step 702), and on receiving the identity of the host MSC 50 (step 703), directs the call there (step 703). The host MSC 50 in turn transmits the call attempt to the currently serving base station, which is in fact the interface unit 52 (step 704). If the disconnect procedure (to be described later with reference to FIG. 8) has been carried out, the call will not be connected to the onboard system (step 705), and instead a signal is transmitted back to the home MSC 70. Otherwise, call attempts received by the interface unit 52 are handled by a call request handling unit 58, which automatically returns a "busy" signal to any such request (step 706). The MSC 50, on receiving the "busy" signal, retrieves the diversion information from the VLR 51 (step 708) allowing it to route the call through the PSTN 8 to the user terminal 21, 21a (step 710).

In the event that the destination terminal 21a is not the terminal 21 that originated the instruction, the call request handling unit 58 of the ground-based interface unit 52 may be arranged such that whenever a message addressed to the user's MSISDN is diverted to the terminal 21a, the call request handling unit 58 also generates a data message (step 711) for transmission to the instructing terminal 21 by way of the MSC 50, PSTN 8, and satellite system 4, 6 (step 712) either during the call or after it ends. Such a message can be used for example to alert the user of the terminal 21 that a facsimile message addressed to him has been sent to the terminal 21a. As with the call alerting process described above, the message may be displayed using the in flight entertainment system 200.

If a second call attempt is made, the ACSE 40 may identify that the divert instruction will not work as it is currently handling a diverted call to that number. The default condition in such cases is to arrange for the second call to be diverted to the user's voicemail address (not shown) in his home network 7. The user may also be sent a data message to inform him of the new voicemail message. This message would normally be sent to the mobile unit, which appears to the MSC 50 to be co-operating with the interface unit 52, so the MSC 50 transmits the data message to the interface unit 52 (step 711). In order to inform the user of the new voice mail message, the interface unit 52 now regenerates the data message for forwarding to the user terminal 21 via the MSC 50, PSTN 8, and satellite system 4, 6 (step 712) either during the call or after it ends. However, data messages are not suitable for switching via the MSC 50 and PSTN 8, nor for handling by the on-board terminal 21 as it is only equipped for voice. Because the IMSI is recorded in the HLR 73 as being registered with the "Virtual" BSC, or interface unit, 52, any other data messages intended for the user will also be routed to the interface unit 52, and require forwarding to the user. The way this is achieved, according to the invention, will be discussed later, with reference to FIGS. 9 and 10. As with the call alerting process described above, the message may be displayed using the in flight entertainment system 200.

Generally, the detection of the same IMSI from two sources causes an HLR to disconnect both callers as a fraud prevention measure. Since this system causes the generation of an IMSI from the interface unit 52, instead of directly from the mobile telephone to which that IMSI relates, the user's mobile telephone should be switched off, or connected to an onboard interface device 311 which disconnects the radio circuits, to prevent the network detecting the IMSI in two places, which would disrupt the call routing processes in the HLR 73 and elsewhere. If the user is on board an aircraft, he should not be using his mobile handset in the conventional manner, and so there should be no problem. However, if the user, having left the aircraft, switches on his telephone 75 before the network 5 has reported a loss of the mobile unit from its own network, the mobile unit may be perceived by the HLR 73 as being registered with two networks at once. To avoid this possibility, a disconnection procedure is followed as described with reference to FIG. 8.

As already discussed, to stop calls being diverted to the user termination point 21, and restore the original call diversion settings, a disconnection signal may be transmitted from the onboard system 28 to the host network's interface unit 52 (step 801). The disconnection signal may be activated by a special code entered by the user, or it may be generated automatically by data collected from the aircraft's data bus 22 indicative of the imminent end of the flight. Note that this disconnection signal merely controls the interface 52—it has no effect on calls in progress, which is routed from the host MSC 50 by way of the PSTN 8.

The disconnect instruction is received by the interface unit 52 (step 802) and causes the call diversion instruction unit 56 to retrieve the call diversion data stored in the store 57 (step 803) and generate a call diversion instruction restoring the original settings to the VLR 51 (step 804). This ensures no further calls are routed to the onboard terminal 21.

The interface unit 52 next causes the network registration unit 55 in the interface unit 5 to instruct the MSC 50 that the user is no longer connected to the network 5 (step 805). This allows the mobile unit to register with another network 7 in the normal way. Call attempts to the user number will continue to be routed by the Home HLR 73 to the MSC 50 with which the mobile unit was most recently registered, (i.e. the host MSC 50) but as that MSC cannot now find the mobile unit, any such incoming call will return a "not found" signal to the home MSC 70 which will divert the call according to any diversion instructions set up, or fail the call. Alternatively, the host MSC 50 may handle the diversion itself if the mobile unit is "not found", using the original diversion instructions now in the VLR 51, having been retrieved from the store 57 (step 804 above).

Having left the aircraft, the user may switch on his mobile telephone 75, which will register with the local network (e.g. 7) and will retrieve the original divert information from the HLR 73 (note that in general the HLR 73 will not be in the same network), and will cause all data relating to the user to be deleted from the VLR 51 in the "host" network 5.

Figure 11:
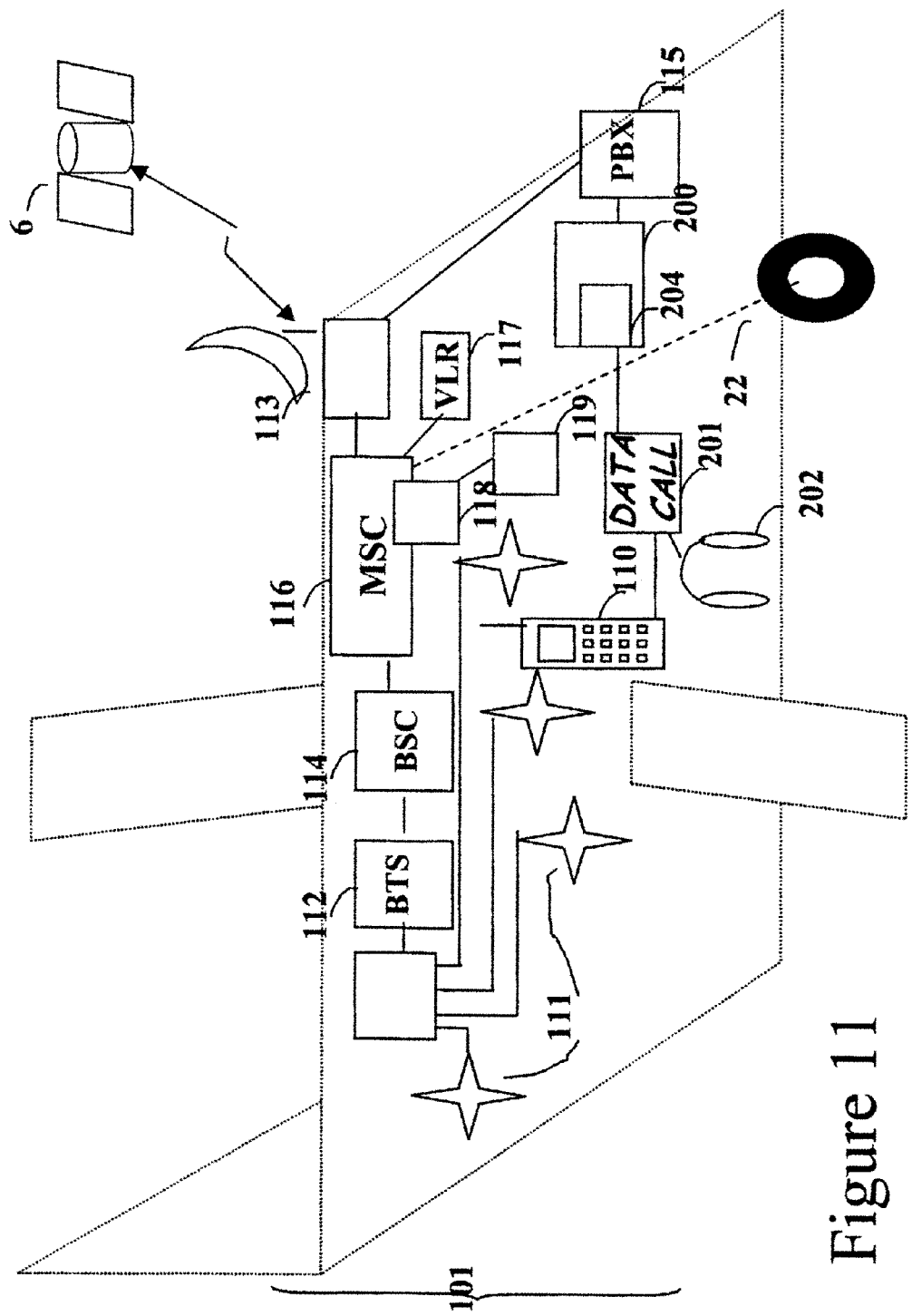
FIGS. 11 and 12 show the general arrangement of the various components which co-operate in a further embodiment of the invention.
Figure 12:
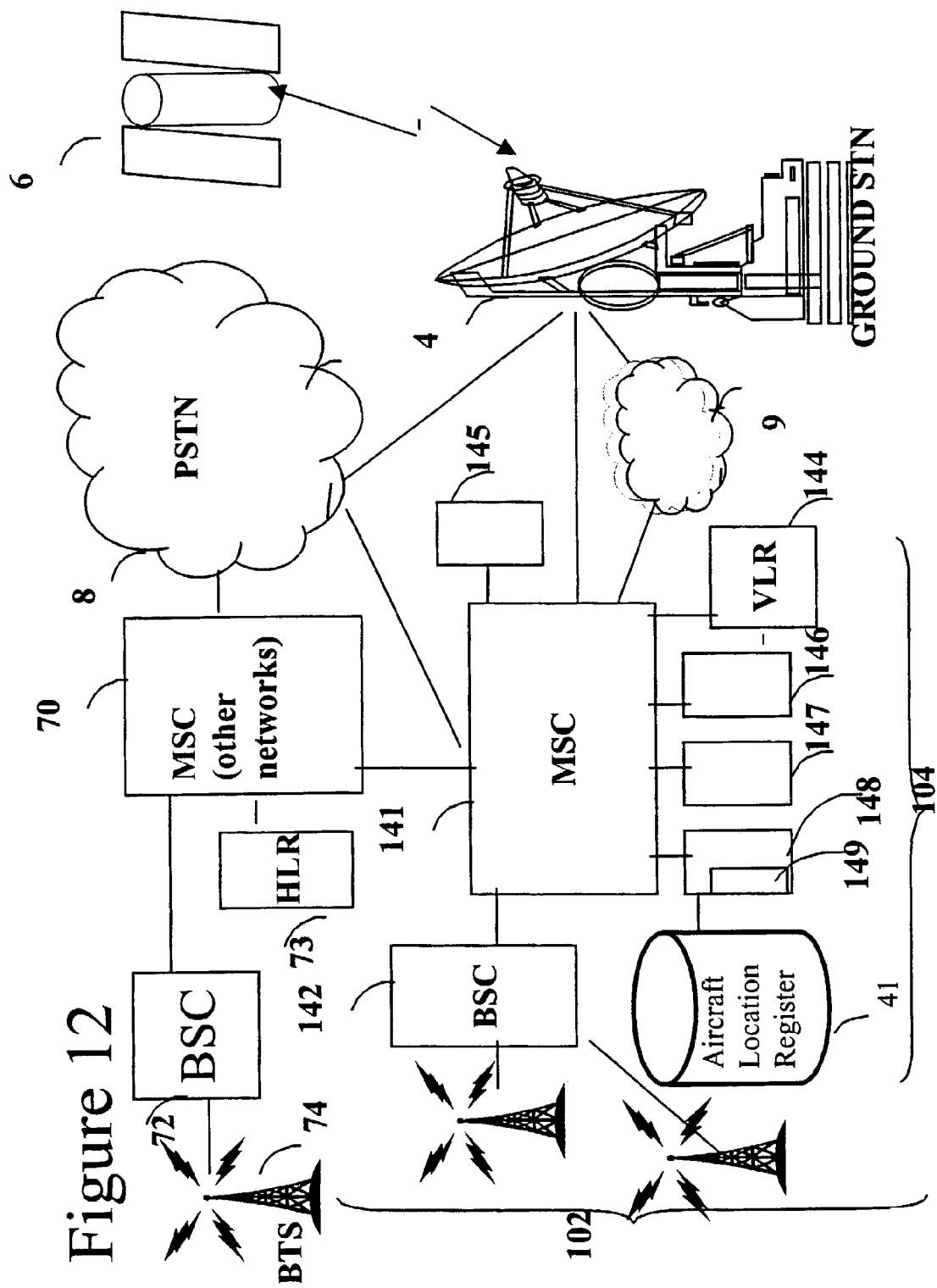

An alternative embodiment, in which voice calls are handled by a user's cellular handset but data calls and call alerts are still handled by the onboard in-flight entertainment system, is depicted in FIGS. 11 and 12.

The system can be categorized into two main components: namely the onboard part 101 (FIG. 11) and the fixed part 102 (FIG. 12), which communicate with each other through a satellite connection 6. The onboard part (FIG. 11) comprises a moveable cellular system 111, 112, 114, 116 and the onboard part 113 of the tracking radio system. The fixed part 102 (FIG. 12) is itself in two parts, namely a satellite ground station 4, which is similar to that shown in FIG. 1, and the fixed "host" cellular network 104, which is a public land mobile network (PLMN) 104, in turn interconnected with other PLMNs 70 and conventional wired networks (PSTN) 8 to allow calls to be made between users of different networks.

As shown in FIG. 11, the system provides a cellular radio subscriber with the ability to use his own handset 110 aboard an aircraft, located anywhere within an agreed satellite coverage area. The coverage on board the aircraft can be provided by any suitable means, using known radio repeater distribution systems 111 to provide radio coverage wherever required.

The distribution system 111 is fed by a base transceiver site 112, served by a base site controller 114 and a mobile switching centre 116, which may have its own visitor location register 117, for onward transmission to the satellite ground station 4 via a satellite tracking system 113. The satellite tracking system may be a conventional satellite telephone system as commonly used for ship-to-shore communications, and for the airborne systems previously referred to, providing a satellite link 6 from the aircraft or ship's satellite tracking system 113 to the satellite ground station 4. The satellite ground station 4 is in turn connected to the mobile switching centre (MSC) 141 of a conventional cellular telephone system, referred to hereinafter as the "host" system 104 and shown in FIG. 12.

The satellite link 4-6-113 is therefore between the onboard MSC 116 and an MSC 141 (the "host" MSC) of the land-fixed "host" network 104. The user record in the home location register (HLR) 73 of the user's home network identifies the mobile unit 110 as currently served by the land-based network 104, and routes the call to the host MSC 141, which will in turn recognise from its entry in the land based VLR 144 that this mobile unit is currently being served by the onboard MSC 116. The way this is arranged will be described later.

This arrangement allows integration of the onboard MSC 116 with the onboard switching capability associated with the conventional satellite telephone system and the aircraft's internal communications system 115. In particular it provides a simple means of providing passengers and crew with a "Wireless PBX" facility, as users on board the aircraft can communicate with each other through the BSC 114 without using the satellite link 4-6-113. When a call is made by a cellular telephone 110, the onboard MSC 116 first consults its VLR 117 to establish whether the called party is currently served by the same MSC 116. If this is the case, it connects the call without the use of any inter-MSC links. Thus calls made between two users both on board the aircraft 101 may be made without the use of the satellite link 4-6-113. The satellite connection provides several voice channels and a signalling channel (supervisory control-management channel), and can be made by any connection of appropriate capacity.

The host network 104 may support one or more further base site controllers 142 controlling conventional base transceiver sites 74. The host Mobile Switching Centre 141 also has an associated "Visitor Location Register" 144 which, in conventional manner, records details of the cellular telephones currently co-operating with the Mobile Switching Centre 141, so that details can be exchanged with the Home Location Register 73 of the user's home network for billing purposes, and to allow incoming calls to be routed correctly. These details include the identity of the link 4, 142 to which the user is connected, allowing different call charges to be applied for use in different cells, and in particular to distinguish between calls made through the onboard base transceiver site 112 and calls made through conventional base site controllers 142.

In the cellular mobile network 104, standard GSM functionality is used. Users aboard the aircraft will be able to use this service provided they are subscribers to the host network 104, or any other network 70 which has a "roaming" agreement with the host network 104, provided the subscriber has the roaming capability authorised by his service provider.

In this embodiment of the invention, the "host" network 104 operates like a conventional cellular network, but is provided with an interface unit 148 for interworking with the satellite ground station 4. This interface 148 allows the switching centre 141 to obtain user details (in particular the identity of a mobile handset) from the satellite system 4 to allow it to appear to the network 104, and thus to the HLR 73 in the user's home network, that the mobile handset is in radio communication with a base station under the control of the mobile switching centre 141 when in fact it is in communication with the onboard MSC 116. The mobile switching centre can then arrange for call forwarding instructions to be stored in the VLR 144, to cause incoming calls directed to that handset to be diverted, through the switching system 40 of the satellite network 4, to the onboard MSC 116.

The operation of the system is as follows. When a mobile unit 110 first makes contact with the onboard cellular system 101 it transmits its identity code (IMSI) to the onboard MSC 116 in the usual way. The onboard MSC 116 can obtain verification data from the user's HLR 73 (identified by the IMSI code) to verify the authenticity of the user, and permit outgoing calls. However, because the onboard MSC 116 is only contactable through the satellite system, incoming calls to the mobile unit 110 cannot be reliably routed to the onboard MSC 116 over a conventional link. In order to avoid a requirement for special facilities in each network 70 it is convenient to make the mobile unit 110 appear to be working to a conventional mobile switching centre 141.

When the onboard MSC 116 detects a call attempt or registration attempt from a mobile unit 110, it collects from the mobile unit its identity code (IMSI) and passes it to a processor 118. If the processor 118 has not previously done so, it generates a temporary onboard identity for association with the mobile identity code (IMSI), and stores it in a memory 119. For aircraft fitted with at-seat satellite telephone equipment, each handset has an identity code (generally related to the number of the passenger seat to which the handset is fitted) to allow outgoing calls to be billed to the correct user and to allow the system to be used to communicate between passengers. Spare numbers in this system (referred to herein as "pseudo seat numbers"—PSN) may be used as the temporary onboard identities allocated to mobile handsets working to the onboard MSC 116. If the mobile handset 110 has previously contacted the onboard MSC 116, and not subsequently de-registered, the processor 118 now retrieves the PSN corresponding to the IMSI from the memory 119.

As with the arrangement of FIG. 1, the present embodiment allows the host network to translate the called party's IMSI to an AES code (including seat number), which in this case is a pseudo-seat number (PSN) allocated randomly from the numbers left spare after codes have been allocated for at-seat terminals. The translation takes place in the host network, without the need for the caller to know the AES code. The temporary onboard identity code PSN associated with the called party's IMSI is returned to the onboard MSC 116 which sets up a call over the satellite system to the host MSC 141 of the host network 104. The satellite system requires certain authentication data on call set up, namely the AES code and a subscriber identity code which normally identifies an individual subscriber to the satellite system or, if the user does not have an account with the satellite system, credit card details or other details to allow payment to be made. In the present case the onboard MSC 116 provides the cellular telephone's code (IMSI) as the subscriber identity code. For security reasons, this code may be encrypted. If an outgoing call attempt is being made, a call attempt is then made to the number dialed; otherwise a special code, referred to herein as the non-call code ("NCC") is used.

If the caller has not previously been registered, but a special non-call registration code is used, the ACSE 40 of the ground station 4 recognises it as being an authorised free call to the host MSC 141 and routes it accordingly. Calls using this code are permitted even if the IMSI has not previously been registered with it.

The host network 104 will, in general, not be the same as the user's home network 70. In the host network 104 an interface unit 148 provides certain additional functionality to co-operate with the satellite ground station 4.

When a call is received by the satellite ground station 4 using the non-call code (NCC) the ACSE 40 retrieves the data and passes it to an interface unit 148, which retrieves the identity (IMSI) of the cellular telephone, and the PSN associated with it. The IMSI (de-encrypted if necessary), is passed to a network registration unit 145 which exchanges signals with the host mobile switching centre 141 in the same way that a real cellular telephone would do if registering through one of its base stations 74. The mobile switching centre therefore informs the user's Home Location Register 73 that the mobile telephone is now registered with the network 104. The Home Location Register 73 records that the mobile handset is now registered with host MSC 141.

It should be noted that, although registered with the host MSC 141, the user's mobile handset is not operatively connected to the host MSC 141. The user, and the handset, may be on a suitably equipped vehicle anywhere in the world within the coverage area of the satellite network 6.

The user's details, including any diversion instructions, are next sent by the Home Location Register 73 to the network's VLR 144. A store 147 records a copy of the details of these diversion instructions for subsequent retrieval when the mobile unit deregisters.

Conventionally, any incoming calls for a mobile user are sent in the first instance to the user's home network 70, and the HLR 73 provides information to identify the MSC where the mobile handset is expected to be found, which is the host MSC 141. Consequently, in the present arrangement, any incoming calls intended for the mobile user will now be directed to the network 104, as the mobile user is currently registered there.

The interface unit 148 passes the AES code to a call diversion instruction unit 146, which generates a "divert on busy" instruction to the VLR 144. This is a standard divert arrangement, and operates such that should the mobile unit appear to be already engaged on a call when a new call attempt is made to it, the new call attempt is diverted to a specified directory number, in this case the AES code allocated to the mobile unit. This diversion instruction replaces any previous instruction held in the VLR 144.

Finally, the registration process is closed by returning an authorization code from the host MSC 141 to the subscriber management system 42 of the satellite system 4, to allow the IMSI to be recognised as a valid user identification for subsequent outgoing calls.

The aircraft may have an at seat information system 200 with provision for connection of the handset 110, similar to the hands-free sets commonly provided in cars. This allows audio signals to be transferred to the at-seat system's headset 202, preventing disturbance to other passengers. The at-seat system may also have means for collecting ringing tone from the handset 110, and generating a visual alert on the display screen 201 or an audible one on the headset 202.

Figure 13:
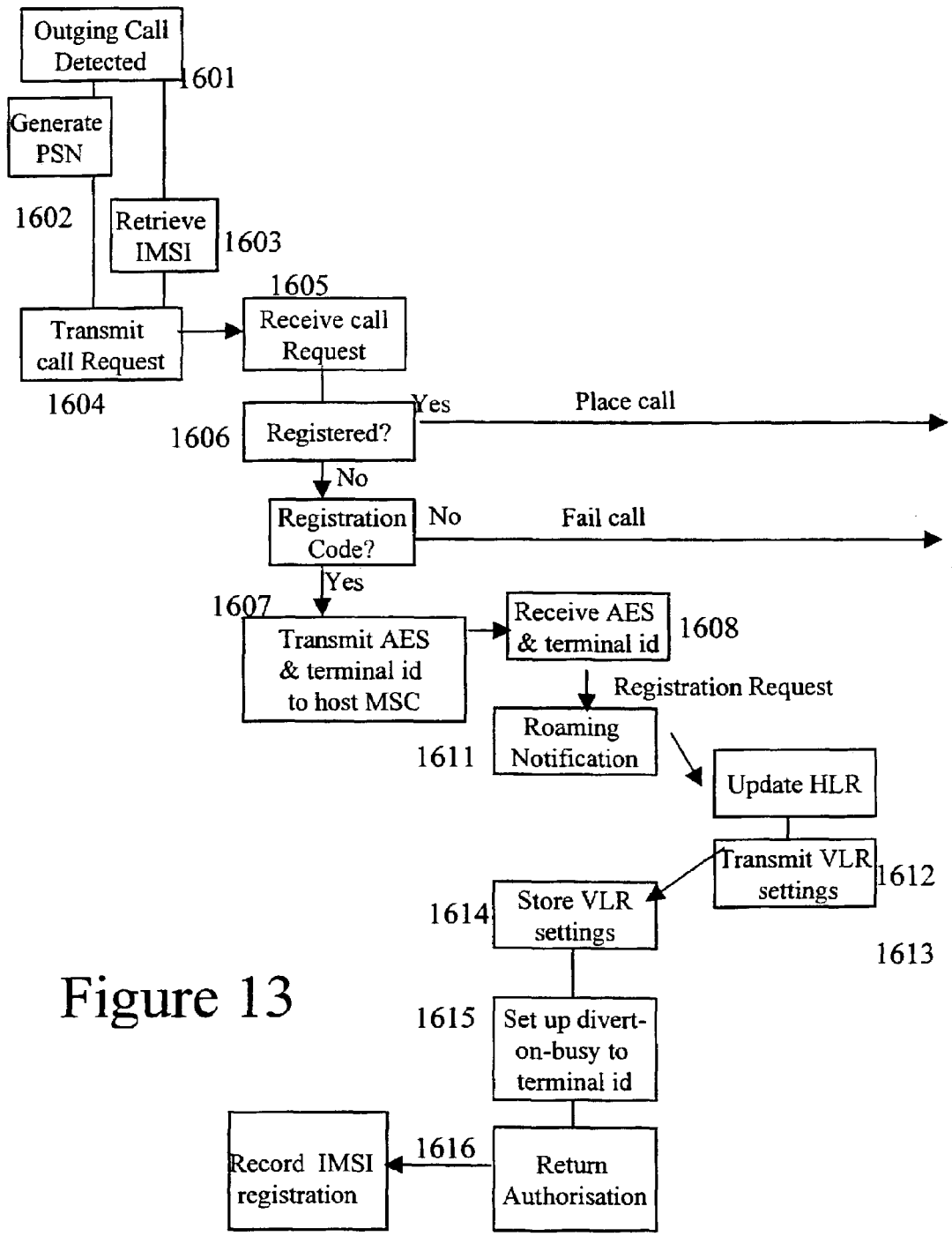
FIGS. 13 and 14 show the method of operation of this embodiment

The operation of the system will now be described with reference to FIG. 13. When a mobile unit 10 first makes contact with the onboard cellular system 101 it transmits its identity code (IMSI) to the onboard MSC 116 in the usual way. The onboard MSC 116 can obtain verification data from the user's HLR 73 (identified by the IMSI code) to verify the authenticity of the user, and permit outgoing calls. However, because the onboard MSC 116 is only contactable through the satellite system, incoming calls to the mobile unit 110 cannot be reliably routed to the onboard MSC 116 over a conventional link. In order to avoid a requirement for special facilities in each network 70 it is convenient to make the mobile unit 110 appear to be working to a conventional mobile switching centre 141.

When the onboard MSC 116 detects a call attempt or registration attempt from a mobile unit 110, (step 1601) it collects from the mobile unit its identity code (IMSI) and passes it to a processor 118. If the processor 118 has not previously done so, it generates a temporary onboard identity for association with the mobile identity code (IMSI), and stores it in a memory 119 (step 1602). For aircraft fitted with at-seat satellite telephone equipment, each handset has an identity code (generally related to the number of the passenger seat to which the handset is fitted) to allow outgoing calls to be billed to the correct user and to allow the system to be used to communicate between passengers. Spare numbers in this system (referred to herein as "pseudo seat numbers"—PSN) may be used as the temporary onboard identities allocated to mobile handsets working to the onboard MSC 116. If the mobile handset 110 has previously contacted the onboard MSC 116, and not subsequently de-registered, the processor 118 retrieves the PSN corresponding to the IMSI from the memory 119 (step 1603).

In existing onboard systems a user cannot receive calls unless the caller knows the unique "AES" number of the at-seat terminal 201, which is made up of the seat code and an identity code of the aircraft (which together make up a unique "AES" code). It is unlikely, even for a normal satellite handset, that a caller would know the AES code, as the number depends on the identity of the aircraft, the seat, and the serving satellite or base station. (It should be noted that the passenger list of an aircraft is not normally released to the general public until the flight has ended, for security reasons). The present embodiment allows the host network to translate the called party's IMSI to an AES code, which includes a pseudo-seat number (PSN), which is allocated randomly from the numbers left spare after codes have been allocated for at-seat terminals. The translation takes place in the host network, without the need for the caller to know the AES code.

The temporary onboard identity code PSN associated with the called party's IMSI is returned to the onboard MSC 116 which sets up a call over the satellite system to the host MSC 141 of the host network 104 (step 1604). For a normal satellite call, the satellite system requires certain authentication data on call set up, namely the AES code and a subscriber identity code which normally identifies an individual subscriber to the satellite system or, if the user does not have an account with the satellite system, credit card details or other details to allow payment to be made. In the present case the onboard MSC 116 provides the cellular telephone's code (IMSI) as the subscriber identity code. For security reasons, this code may be encrypted. If an outgoing call attempt is being made, a call attempt is then made to the number dialed; otherwise a special code, referred to herein as the non-call code ("NCC") is used.

The satellite ground station 4 shown in FIG. 4 has a radio antenna system 44 for communicating with the onboard system 101, through a satellite link 6 or otherwise. Signals are handled by an Access Control Signalling Equipment (ACSE) 40 which carries out switching functions to route calls to or from the public switched telephone network (PSTN) 8.

A subscriber management system 42 in the satellite ground station comprises a data acquisition unit 47 which reads identification data transmitted from the aircraft (step 1605) to identify the subscriber, confirm his account details and arrange billing for any calls made, through a billing system 45 which raises invoices, or interacts with the systems of a credit card operator, bank, or other telephone operator. In the present case the card management system recognises the IMSI transmitted as the subscriber identity. Provided the IMSI has previously been registered with the subscriber management system 42 (as will shortly be described: step 1616) the call is authorised using the satellite system's authorization checking and billing system as for any call from an onboard satellite terminal, and connected to the PSTN 8 (step 1606), billing details being passed to the home network through the host MSC 141.

If the caller has not previously been registered, but a special non-call registration code is used, the ACSE 40 recognises it as being an authorised free call to the host MSC 141 and processes it accordingly (step 1607) by retrieving the data and forwarding it to the interface unit 52 in the host network 5. Calls using this code are permitted by the subscriber management system 42 even if the IMSI has not previously been registered with it.

The host network 5, 104 will, in general, not be the same as the user's home network 70. In the host network an interface unit 148 provides certain additional functionality to co-operate with the satellite ground station 4.

When a call is received from the satellite ground station 4 using the non-call code (NCC) the ACSE 40 transmits the data to the interface unit 148 (step 1608). The interface unit 148 then retrieves the identity (IMSI) of the cellular telephone, and the AES identity of the onboard terminal 201 (step 1608, FIG. 13). The IMSI (de-encrypted if necessary), is passed to a network registration unit 145 which exchanges signals with the host mobile switching centre 141 in the same way that a real cellular telephone would do if registering through one of its base stations 74. The mobile switching centre therefore informs the user's Home Location Register 73 that the mobile telephone is now registered with the network 104 (step 1611). The Home Location Register 73 records that the mobile handset is now registered with host MSC 141 (step 1612).

It should be noted that, although registered with the host MSC 141, the user's mobile handset is not operatively connected to the host MSC 141. The user, and the handset, may be on a suitably equipped vehicle anywhere in the world within the coverage area of the satellite network 6.

The user's details, including any diversion instructions, are next sent by the Home Location Register 73 to the host network's VLR 144 (step 1613). A store 147 records a copy of the details of these diversion instructions (step 1614).

Conventionally, any incoming calls for a mobile user are sent in the first instance to the user's home network 70, and the HLR 73 provides information to identify the MSC where the mobile handset is expected to be found, which is the host MSC 141. Consequently, in the present arrangement, any incoming calls intended for the mobile user will now be directed to the network 104, as the mobile user is currently registered there.

The interface unit 148 passes the AES code to a call diversion instruction unit 46, which generates a "divert on busy" instruction to the VLR 144 (step 1615). This is a standard divert arrangement, and operates such that should the mobile unit appear to be already engaged on a call when a new call attempt is made to it, the new call attempt is diverted to a specified directory number, in this case the AES code allocated to the mobile unit. This diversion instruction replaces any previous instruction held in the VLR 144.

Finally, the registration process is closed by returning an authorization code from the host MSC 141 to the subscriber management system 42 (step 1616) to allow the IMSI to be recognised as a valid user identification for subsequent outgoing calls.

Figure 14:
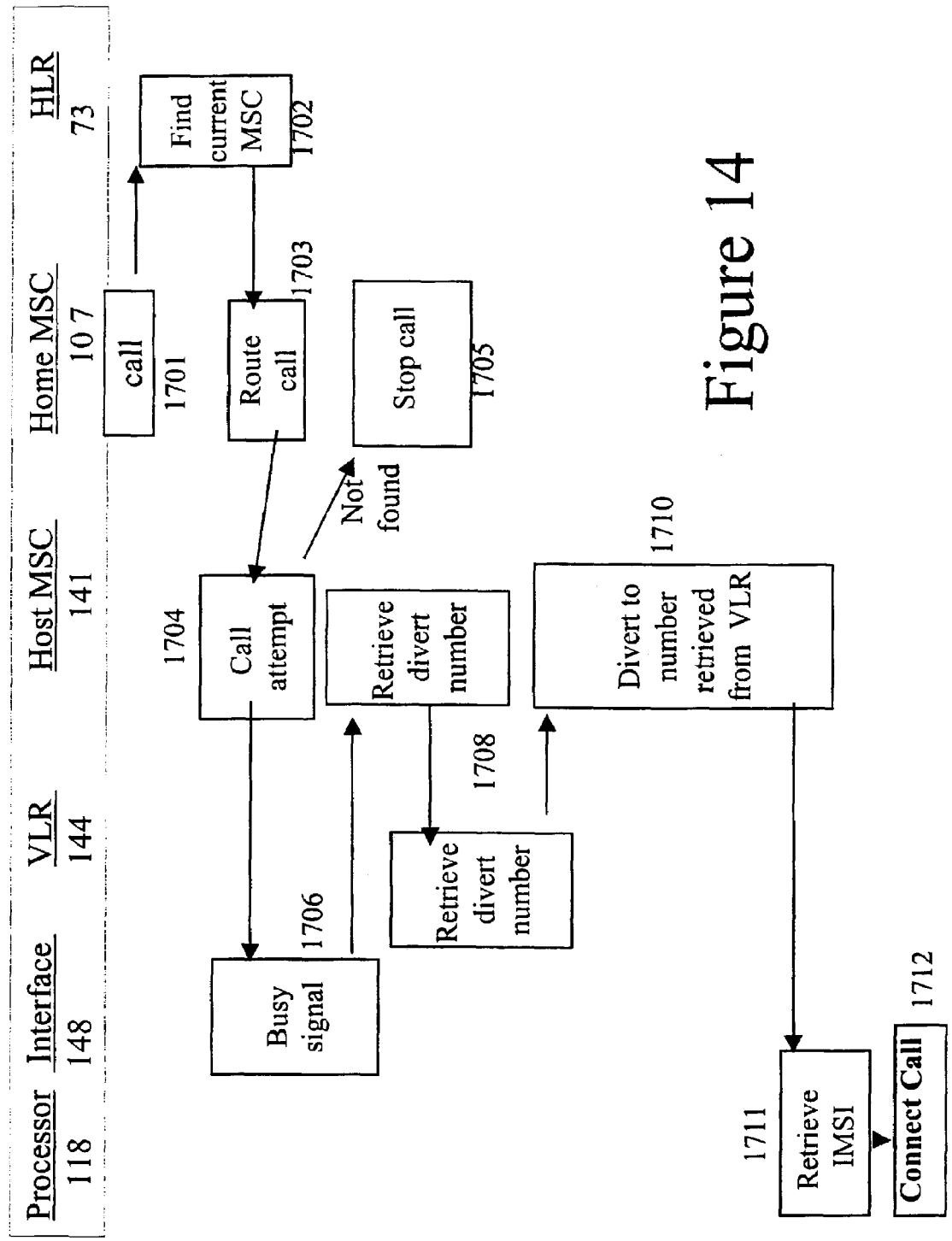

Of course, although the mobile telephone 10 is recorded in the home location register 73 and in the host's visitor location register 144 as being connected to the host MSC 141, it is not really there and therefore the host MSC 141 is unable to connect incoming calls to the mobile telephone in the conventional way, or to identify the current true operating condition (switched off, busy, ready for calls, etc) of the mobile handset 110. Instead, the system responds to a call attempt as will now be described with reference to FIG. 14.

When a call attempt is made (step 1701), the MSC in the home network 70 to which the call is initially routed obtains from the HLR 73 the current location of the mobile telephone (step 1702), and on receiving the identity of the host MSC 141, directs the call there (step 1703). The host MSC 141 in turn attempts to transmit the call attempt to the currently serving base station, which is in fact the interface unit 148 (step 1704). If the disconnect procedure already described with reference to FIG. 8) has been carried out, the call will not be connected (step 1705) and a signal is transmitted back to the home MSC 70. Otherwise, the interface unit 148 automatically returns a "busy" signal to any such request (step 1706). Note that the interface unit 148 has no information regarding the true operating state of the mobile unit 110. It is merely arranged to emulate the target mobile unit's response to a call attempt when the target mobile unit is in the "busy" condition.

The host MSC 141, on receiving the "busy" signal, checks whether any incoming call currently in progress to that mobile handset has already been diverted (step 1707). (This is a standard procedure, done to ensure that call diversions are not attempted if they will not actually succeed). If there is no such diverted call in progress, the host MSC 141 retrieves the diversion information (the AES) from the VLR 144 (step 1708) allowing it to route the call through the PSTN 8 and the satellite system 3 to the onboard system 101 (step 1710).

The onboard system 101 routes incoming calls to a node of the onboard system according to the AES code. If the node is connected to a real at-seat terminal, the call is simply routed to that terminal. However, in this case, the code corresponds to a pseudo seat number, which the onboard satellite system switch 113 recognises as meaning that the call is to be routed to a node connected to the onboard MSC 116. The onboard MSC 116 uses the processor 118 to retrieve from the memory 119 the cellular identity (IMSI) corresponding to the PSN, (step 1711) and then connects the call to the mobile handset 110 having that identity in the conventional manner (step 1712). Thus the interaction between the onboard MSC 116 and the handset 110 is entirely conventional: ordinary handsets can be used and no initial authorization is required other than the standard procedures used to ensure that international "roaming" is permitted.

If a second call attempt is made to a handset already in use, the ACSE 50 will identify that the divert instruction will not work as it is already handling a diverted call to that number. The default condition in such cases is to arrange for the second call to be diverted to the users' voicemail address (not shown) in his home network 70. The user may also be sent a message to inform him of the new voicemail message. This message would normally be sent to the mobile unit, which appears to the host MSC 141 to be co-operating with the interface unit 148, so the host MSC 141 transmits the data message to the interface unit 148 (step 1711). In order to inform the user of the new voice mail message, the interface unit 148 now regenerates the data message for forwarding to the onboard MSC 116 via the satellite system 3 (step 1712) for alerting the user terminal 110 either during the call or after it ends.

As the onboard system 101 is itself mobile, being on board an aircraft, call routing to that termination may require revision from time to time. For example, the "Inmarsat" satellite system comprises several geostationary satellites, which each provide cover for part of the earth's surface. These areas of coverage overlap to a large extent, but nevertheless on a long flight the aircraft may pass out of the area covered by one satellite into that served by another. This causes a small but significant change in the network address AES of any terminal on board the aircraft. The aircraft location register 41 monitors the identity of all aircraft currently being handled by the satellite ground station 4. When an aircraft moves into range of a different satellite 6, the call diversion unit 146 responds by transmitting a new call diversion instruction to the VLR 144, so that any further incoming call attempts are diverted to the new network address (AES) of the node corresponding to the terminal 110. Note that the diversion store 147 is not updated.

Note also that this does not affect calls already in progress. There is usually sufficient overlap in satellite coverage areas that handover from one satellite or base station to another can be arranged to take place when no call is in progress.

During the flight the user may decide that he no longer wishes to have his calls diverted to the terminal 110, and switches it off. The onboard MSC 116 will therefore fail to locate the mobile handset 110 at the next registration update. As previously discussed, it is also desirable to disable the onboard system 101 when the aircraft is on approach to landing, to avoid interference with aircraft systems at this critical point in the flight (or distractions to passengers in the event of an emergency), and also to avoid interference with base stations on the ground. Disconnect codes may therefore be generated in the onboard MSC 116 for all the handsets 110, either by the cabin crew or automatically in response to a signal detected on the aircraft's data bus 22 which is indicative of the imminent end of the journey, such as time remaining to destination (as determined by the aircraft's flight management system), low altitude, deployment of undercarriage, or weight on wheels.

On receiving a de-registration signal (steps 801,802 FIG. 8), the host network 104 retrieves the original divert information from the store 147 (step 803) and stores that in the VLR 144 (step 804), thereby restoring the user's own selected divert instructions automatically.

Once he has left the aircraft, the user may switch on his mobile telephone 110, which will register with the local network (e.g. network 70), informing the home location register 73 of the location update (note that in general the HLR 73 will not be in the same network as the local network 70). The HLR 73 retrieves the user's VLR settings from the previous host network 102. Because the original VLR data has been restored (step 804), the temporary divert data used whilst the user was connected to the onboard system is not fed back to the HLR. All data relating to the user can then be deleted from the VLR 44 in the "host" network 102.

In use, both parties to a call, and most of the cellular network, operate normally. The cellular telephone 110 co-operates with the base station 112 on the aircraft as it would with any other base station 74. The home location register 73 identifies the cellular telephone 110 as currently served by the host MSC 141, and routes incoming calls accordingly. This invention therefore allows connection to be made to conventional handsets 110 using standard cellular telephony equipment. The operation of the host MSC 141 and the onboard MSC 116 are both largely conventional except for the number translation functions carried out by the interface units 118, 148. Using roaming capabilities, just one host MSC 141 can provide connection to a large number of airborne MSCs 116, anywhere in the range of the satellite system 4, 6.

Figure 10:
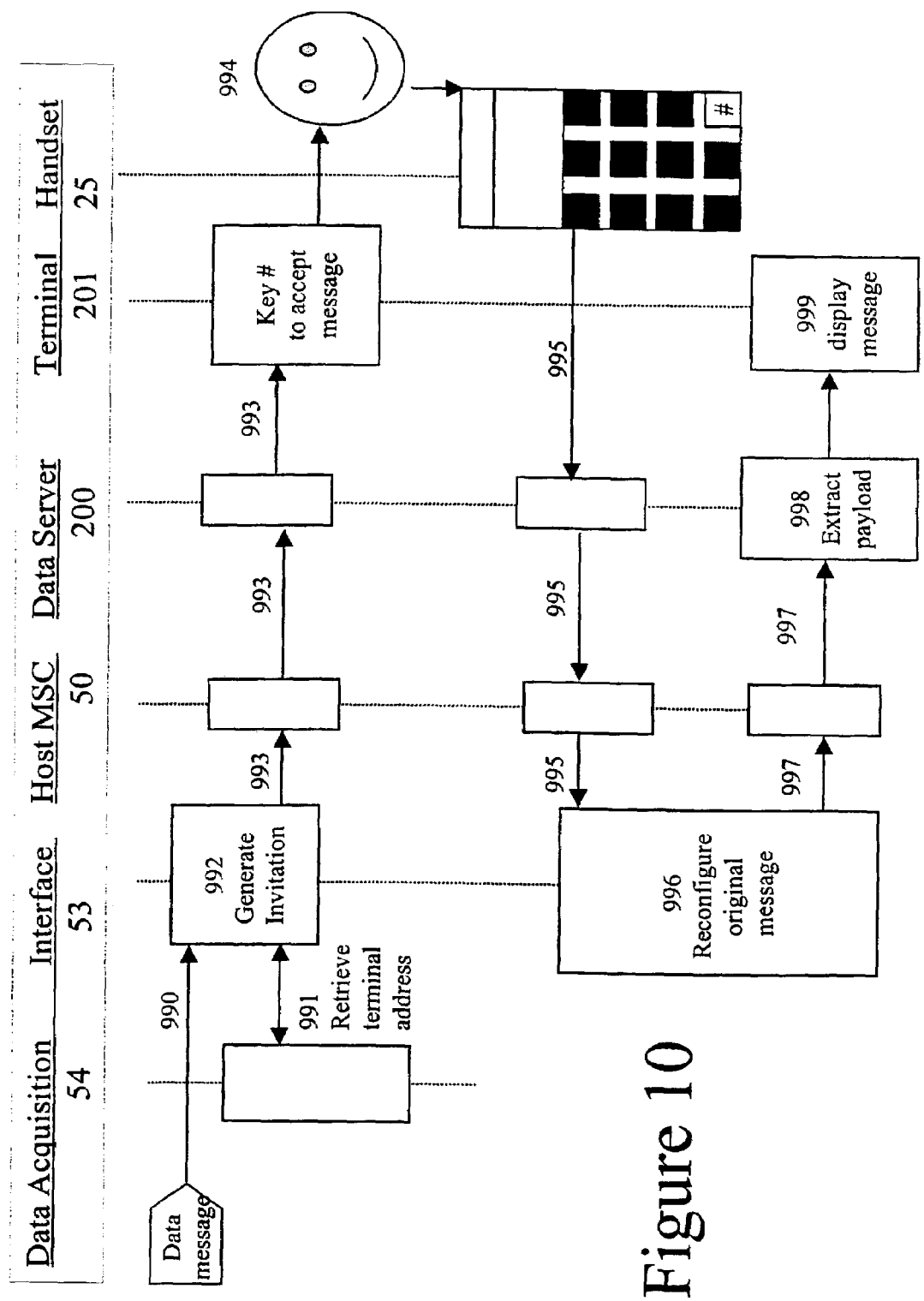
FIG. 10 illustrates a conditional forwarding process for a data message.

To allow the use of the at seat display system 201 for data messages, not suitable for transmission over the PSTN and satellite system in their original form the interface unit 52 (FIG. 5), 148 (FIG. 12) is provided with a data handling processor 53,149 for receiving data messages received over a packet data system 9 by way of the MSC 50,141 and intended for users currently associated with the interface unit 52,148. These messages include SMS messages sent from other callers, and SMS messages generated by the MSC 50,141 itself to alert the user that a message has been sent to the voice mail system. The format of such a message is shown in FIG. 9, and the process of sending and receiving it is shown in FIG. 10.

The original message 900 basically consists of a data payload 901 and an address 902, which is the IMSI of the destination mobile telephone (FIG. 9a).

When the interface unit 53,148 receives such a data message (step 990) it retrieves from the data acquisition unit 54,149 the data network address of the at-seat entertainment terminal 201 corresponding to the user's cellular identity which was originally provided to the data acquisition unit 54,149 when the user carried out the registration procedure (step 991). The interface unit 53,148 next generates a data call to that address (step 992), in a form suitable for transmission by the MSC 50,141 (step 993) over the packet data network 9 to the aircraft, with an address header corresponding to the data network address of the user's at-seat terminal 201,201. This data call may be a short message to indicate that a message is awaiting delivery, and displaying on the screen 201 an invitation to the user to dial a special code on his handset 25,110 to accept the message (step 994), and any charge associated with it. This acceptance is transmitted back, by way of the MSC 50, 141 to the interface unit 53,148 (step 995). (These steps 992-995 may be omitted if it is not required for users to acknowledge acceptance before receiving a data message).

The interface unit 53,148 then replaces the address header (the IMSI) 902 in the original data message with a code 912 identifying the terminal 201 and encapsulates the message in a form suitable for transmission over the packet data network 9 to the aircraft (step (996), with an address header 910 to send it to the data network interface 28, 204 serving the onboard entertainment system 200. It can thus be transmitted to the interface 28, 204 over the packet data network 9 (step 997), effectively as a packet with an address header 910 and a payload made up of the at-seat terminal number 912 and true payload 901 (FIG. 9b).

On receipt of the data message, the on board data interface 28, 204 extracts the data message payload 901, 912, (FIG. 9c) (step 998) and identifies the individual at-seat terminal 201 identified by the address 912. It can then cause display of the data message payload 901 on the screen 201 of the appropriate terminal (step 999).

If password protection is required, for example to ensure that the user is resent when the message is displayed, the payload 901, 912 can also include a password code 913, which causes the interface 28, 204 to withhold the remainder of the payload until a predetermined sequence of keystrokes has been entered by the user in the terminal 201.

In the embodiment of FIGS. 11 and 12 it is arranged that the MSC 141 has similar features to those described for the MSC 50 and described with reference to FIGS. 9 and 10. The invitation (step 992) is sent as a voice message to the user terminal 110, and prompts the user to identify his at-seat terminal (in practice the user will be asked for his seat number), either by key presses (using DTMF coding) or by voice (step 995). The acceptance step is therefore performed over the voice network, rather than the data network. The MSC uses this information to generate an AES code identifying the user terminal, to be applied to the data message 910 (FIG. 9). The host MSC may store this code for use with subsequent data messages, allowing the host MSC 141 to process further data messages without requesting this information from the user again. The request for the user's seat number may instead be made when he first registers his telephone 110 with the onboard MSC 116.

As the termination is itself mobile, being on board an aircraft, call routing to that termination may require revision from time to time. For example, the "Inmarsat" satellite system comprises several geostationary satellites, which each provide cover for part of the earth's surface. These areas of coverage overlap to a large extent, but nevertheless on a long flight the aircraft may pass out of the area covered by one satellite into that served by another. This causes a small but significant change in the network address of any satellite terminal on board the aircraft. The aircraft location register 41 monitors the identity of all aircraft currently being handled by each ground station 4. When it an aircraft location is updated, it sends an instruction to the interface unit 5, 148. The call diversion instruction unit 56, 146 responds by transmitting a new call diversion instruction to the VLR 51,144 so that any further incoming call attempts are diverted to the new network address of the terminal. Note that the diversion store 57,147 is not updated. Note also that this does not affect calls already in progress: there is usually sufficient overlap in coverage areas that handover from one satellite or base station to another can be arranged to take place when no call is in progress.

FIG. 15 shows a process for intercepting calls when the onboard system 2, 101 is switched off at times when its operation could interfere with conventional land-based cellular systems or with electronic control systems of the vehicle, to enforce "quiet" periods on board, or to allow transfer of the satellite link from one satellite to another. The control to switch the system off may be performed manually or under the control of a sensor detecting interference from nearby radio base stations 74, or an operational condition of the vehicle, such as deployment of the aircraft undercarriage, low altitude, or "weight on wheels", communicated to the onboard system by means of the control data bus 22. When such a disconnection occurs (step 1501), a signal is generated in the onboard system 2, 101 (step 1502) for transmission over the satellite link 6 to the ground station 4 (step 1503). This signal causes the satellite ground station to invoke a call failure mode for any call directed to the onboard system 2, 101 of the specified vehicle (step 1504).

Any call now diverted by the MSC 70, 141 to a number corresponding to a node on board the vehicle (step 1505) will then receive a "call failed" indication from the ground station (step 1506), without any signalling required over the satellite link 6, 206, 406, 506. Such failed calls will be re-routed according to the user's own diversion instructions, stored by the host MSC 50, 141, 241, 470, 541 for use when the user's handset is busy (step 1507). Generally, such instructions will be to divert the call to a voicemail system in the user's home network. In addition, the host MSC 50, 141, 241, 470, 541 will record the existence, and possibly the origin (Calling line identity—CLI) of any such call attempts (step 1508).

When the onboard system 2, 101 is re-activated (step 1511) a further signal is transmitted by the onboard system (step 1512) for transmission over the satellite link 6 to the ground station 4 (step 1513). This signal causes the satellite ground station to revoke the call failure mode for calls directed to the onboard system 2, 101 of the specified vehicle (step 1514). When a user 25, 110 reconnects to the onboard system 2, 101 (step 1515) the onboard system transmits a signal to the host MSC 70, 141 (step 1516) which causes the host MSC to retrieve the call attempt record previously stored for that user (step 1518). If one or more such call attempts have been made, the MSC returns a message to the user 25, 110 (step 1519), prompting the user to retrieve his messages from the voicemail system should he so wish.

The invention claimed is:

1. A method of converting data messages originally formatted for transmission over a first telecommunications network for generation of a display on a display unit of a first type, the conversion being such that messages can be transmitted over another telecommunications network for display by a selected display by a selected display unit of a second type forming part of a server-based information display system, wherein the address information in the original data message is replaced by address information appropriate to the selected display unit to generate an amended data message, and a new data message is created, addressed to the server of the information display system and having the amended data message as payload, and wherein the server converts the amended data message into control instructions suitable to display the information content of the data message on the information display unit identified in the amended data message.

2. A method according to claim 1, wherein the data message is originally formatted for transmission over a cellular telephone network for display by a cellular telephone handset.

3. A method according to claim 1, wherein the data message is generated by the cellular switching system in response to a message being deposited in a call answering system.

4. A method according to claim 1, wherein prior to transmission of the amended original data message to the server an alerting data message is created, indicative of the presence of the original data message, addressed to the server of the information display system, and carrying address information appropriate to the selected display unit, thereby causing the server to generate control instructions suitable to display an altering message on the information display unit so identified, and wherein the amended original data message is forwarded to the server in response to an instruction from a termination point associated with the destination display unit.

5. A method according to claim 1, wherein the amended data message includes password data, and wherein when the server receives a data message it causes the display means to indicate the presence of a data message, and displays the data message only if it receives a predetermined input from a user terminal associated with the display means.

6. Apparatus for converting data messages originally formatted for transmission over a first telecommunications network for generation of a display on a display unit of a first type, such that messages can be transmitted over another telecommunications network for display by a selected display unit of a second type forming part of a server-based information display system, the apparatus comprising means for replacing the address information in the original data message by address information appropriate to the selected display unit to generate an amended data message, means for creating a new data message addressed to the server of the information display system and having the amended data message as payload.

7. Apparatus according to claim 6, comprising means for creating an alerting data message indicative of the presence of the original data message, addressed to the server of the information display system, the alerting message carrying address information appropriate to the selected display unit to cause the server to generate control instructions suitable to display an alerting message on the information display unit so identified, and means for forwarding the amended original data message to the selected server in response to an instruction from a termination point associated with the destination display unit.

8. Apparatus according to claim 6 further comprising means to generate password data.

9. Server apparatus forming part of a server-based information display system for receiving messages generated by the apparatus of claim 6, for display by a selected display unit, the server comprising means for converting a data message formatted for display on a display unit of a first type into control instructions suitable to display the information content of the data message on an information display unit of a second type controlled by the server, the information display unit being identified in the data message.

10. Apparatus according to claim 9, comprising means to cause the display means to indicate the presence of a data message, and means responsive to a predetermined input from a user terminal associated with the display means to display the data message, the predetermined input being a password associated with the data in the data message.

11. Apparatus according to claim 6, wherein the data message is originally formatted for transmission over a cellular telephone network for display by a cellular telephone handset.

12. A method of forwarding a data message to a vehicle, comprising:

registering a user's cellular identity as present aboard a vehicle;

receiving a data message, configured for transmission through a first type of transmission system and intended for the cellular telephone associated with the user's cellular identity, the data message including at least a first address and a data packet, the first address being associated with the user's cellular identity;

associating the data packet with a destination address, the destination address representing a node aboard the vehicle, said associating including reconfiguring the data message for transmission over a second type of transmission system; and forwarding the data packet to the vehicle consistent with the destination address through the second type of transmission system different from the first type.

13. The method of claim 12, further comprising:

said registering comprising linking the user's cellular identity with the destination address; and said associating comprising using the contents of the first address to identify the destination address.

14. The method of claim 12, further comprising:

sending an advisory message to said destination address, the advisory message indicating that the data message is available for forwarding to the node and requesting authorization to forward the data message; and receiving, before said associating, an affirmative response to the advisory message.

15. The method of claim 14, wherein said receiving an affirmative response comprises receiving at least a voice authorization to forward the data message.

16. The method of claim 14, wherein said receiving an affirmative response comprises receiving at least a coded authorization to forward the data message.

17. The method of claim 14, wherein said receiving an affirmative response comprises receiving at least the destination address.

18. The method of claim 8, wherein the first type of transmission system is a public switched telephone network, and the second type of transmission system is a computer network.

19. The method of claim 8, wherein the data packet is originally configured for transmission over a cellular telephone network for display by a cellular telephone handset, and said reconfiguring reconfigures the data packet for transmission over a computer network for display by an display mounted in the vehicle.

20. A method of forwarding a data message, the method comprising:

registering the user's cellular identity as present aboard a vehicle;

linking the user's cellular identity with the destination address;

receiving an original data message intended for a user's cellular telephone and configured for transmission over the public switched telephone network, the data message including at including at least a first address and a data packet, the first address being associated with the user's cellular identity;

determining the user's cellular identity from the original data message, and locating the destination address from the link between the user's cellular identity and the destination address, the destination address representing a display aboard the vehicle associated with the user's cellular identity;

forming a new data message including at least the destination address and data packet, the new data message being configured for transmission over a computer network;

forwarding the new data message to the vehicle consistent with the destination address.

21. The method of claim 20, further comprising:

sending an advisory message to the destination address, the advisory message indicating that a message is available for forwarding and requesting authorization to forward the message; and receiving, before said forming, an affirmative response to said advisory message.

22. The method of claim 21, wherein said receiving an affirmative response comprises receiving at least a voice authorization to forward the message.

23. The method of claim 21, wherein said receiving an affirmative response comprises receiving at least a coded authorization to forward the message.

24. The method of claim 21, wherein said receiving an affirmative response comprises receiving at least the destination address.

25. The method of claim 20, wherein said forming further comprises replacing the first address in the original message with the destination address.

26. An apparatus for a data message to a vehicle, comprising:

an interface including at least a register, a processor, and a transmitter and being configured to:

receive an original data message intended for a user's cellular telephone and configured for transmission over the public switched telephone network, the data message including at including at least a first address and a data packet, the first address being associated with the user's cellular identity;

identify a destination address, the destination address representing a display aboard the vehicle associated with the user's cellular identity;

form a new data message including at least the destination address and data packet, the new data message being configured for transmission over a computer network; and forward the new data message to the vehicle consistent with the destination address;

said interface being configured to send an advisory message to said destination address the advisory message indicating that a message is available for forwarding and requesting authorization to forward the message.

27. The apparatus of claim 26, wherein the interface can communicate with the public switched telephone network and the computer network.

* * * * *